(12) United States Patent
McNally et al.

(10) Patent No.: US 7,228,234 B2
(45) Date of Patent: Jun. 5, 2007

(54) WEATHER DATA QUALITY CONTROL AND RANKING METHOD

(75) Inventors: James T. McNally, Lindenhurst, IL (US); Jeffrey U. Price, Chicago, IL (US); Boris Vaiser, Mt. Prospect, IL (US); Robert C. Allen, Vernon Hills, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 5 days.

(21) Appl. No.: 11/119,459

(22) Filed: Apr. 28, 2005

(65) Prior Publication Data

US 2006/0184326 A1 Aug. 17, 2006

Related U.S. Application Data

(60) Provisional application No. 60/647,100, filed on Jan. 26, 2005.

(51) Int. Cl.
*G01W 1/00* (2006.01)
(52) U.S. Cl. .......................................... 702/3
(58) Field of Classification Search .................. 702/3, 702/4; 703/2, 6
See application file for complete search history.

(56) References Cited

U.S. PATENT DOCUMENTS

| | | | |
|---|---|---|---|
| 6,172,616 B1 | 1/2001 | Johnson et al. | |
| 6,185,483 B1 | 2/2001 | Drees | |
| 6,473,084 B1* | 10/2002 | Phillips et al. | 345/440 |
| 6,636,197 B1 | 10/2003 | Goldenberg et al. | |
| 6,785,592 B1 | 8/2004 | Smith et al. | |
| 2001/0020219 A1 | 9/2001 | Kishlock et al. | |
| 2003/0050738 A1 | 3/2003 | Masticola et al. | |
| 2004/0143396 A1* | 7/2004 | Allen et al. | 702/3 |
| 2004/0215483 A1* | 10/2004 | Fixman | 705/1 |

OTHER PUBLICATIONS

J. Stuart McMenamin & Frank A. Monforte, *Using Neural Networks for Day-Ahead Forecasting*, Itron Technical White Paper, no date supplied.

Marcin Wojnarski, *Modeling the Bank Client's Behavior with LTF-C Neural Network*, Institute of Informatics, Warsaw University, no date supplied.

J. Stuart McMenamin, et al., *Statistical Approaches to Electricity Price Forecasting*, Itron Technical White Paper, no date supplied.

J. Stuart McMenamin, *Why Not Pi? A Primer on Neural Networks for Forecasting*, Itron Technical White Paper, no date supplied.

(Continued)

*Primary Examiner*—Donald McElheny, Jr.

(57) ABSTRACT

A method and system for performing quality control checks upon weather data are provided. The weather data includes information pertaining to a plurality of weather parameters. The quality control checks may identify inaccurate weather parameters or be used to rank weather data sets. The quality control checks include hourly, daily, and forecast quality control checks performed upon hourly, daily, and forecast weather parameter data. The method and system may exclude the inaccurate weather parameters identified from a reasonable weather database. The method and system may determine reasonable or approximate weather parameters that approximate the actual weather parameters. The system may rank a plurality of weather data sets based upon the accuracy determination. The reasonable weather data or the weather data ranked as the most accurate may be used to calculate energy or cost savings for building energy conservation measures.

39 Claims, 19 Drawing Sheets

OTHER PUBLICATIONS

Itron, *Metrix ND The Tool of Choice by Energy Forecasters*, Power Point Presentation.

*EUNITE competition*, Power Point Presentation, no date supplied.

*Electrical Load Forecasting Methods*, available at http://www.aclillc.com/electric_load_forecasting1.htm, no date supplied.

Itron, *Meter Data Management*, no date supplied.

\* cited by examiner

Subject: USC Reports MONTHRECAP:Chicago Branch (01/31/2004)(1)

WEATHER AND ENERGY REPORT [Chicago Branch] [1/31/2004] [Chicago,IL (US)]
++++++++++++++++++++++++++++++++++++++++++++++++++++++++++++++++++++++++

|            | High | Low | Condition      | KW  | KWH | Gas | Steam | Ch.Water |
|------------|------|-----|----------------|-----|-----|-----|-------|----------|
| Actual     | 18   | 16  | Partly Cloudy  | 32  | 594 |     |       |          |
| Expected   |      |     |                | 29  | 560 |     |       |          |
| Percentage |      |     |                | 109%| 106%|     |       |          |

FIVE-DAY WEATHER AND ENERGY REPORT [Chicago Branch] [1/31/2004] [Chicago,IL (US)]
++++++++++++++++++++++++++++++++++++++++++++++++++++++++++++++++++++++++++++++++

| Date       | Day | High | Low | Condition          | KW | KWH  | Gas | Steam Ch.Water |
|------------|-----|------|-----|--------------------|----|------|-----|----------------|
| 02/01/2004 | Sun | 30   | 29  | Mostly Cloudy      | 32 | 576  |     |                |
| 02/02/2004 | Mon | 34   | 31  | PM Wintry Mix      | 68 | 1146 |     |                |
| 02/03/2004 | Tue | 31   | 12  | AM Snow Showers    | 72 | 1146 |     |                |
| 02/04/2004 | Wed | 23   | 18  | Mostly Sunny       | 72 | 1129 |     |                |
| 02/05/2004 | Thu | 31   | 30  | PM Snow / Wind     | 72 | 1132 |     |                |

Figure 7

| Date Ranges (Billing Periods) | | | Last Year Total KWH | Baseline1: Weather Adjusted KWH | Baseline2: Weather+Int'l Adjust KWH | This Year Total KWH | Difference This Yr-BL2 KWH | % Diff | This Year HDD | This Year CDD | Baseline KWH /HDD | Baseline KWH /CDD | This Year KWH /HDD | This Year KWH /CDD |
|---|---|---|---|---|---|---|---|---|---|---|---|---|---|---|
| BP ID | From | To | Days | | | | | | | | | | | |
| | | Totals: | 366 | 8,549,350.1 | 8,409,923.3 | 8,409,923.3 | 8,235,605.1 | -174,318.2 | -2.10% | 6,543 | 637 | | | | |
| 1 | 4/1/2003 | 4/30/2003 | 30 | 673,459.3 | 651,467.9 | 651,467.9 | 692,502.9 | 41,035.0 | 5.90% | 558 | 11 | 1,167 | 59,224 | 1,241 | 62,954 |
| 2 | 5/1/2003 | 5/31/2003 | 31 | 705,762.6 | 683,926.0 | 683,926.0 | 666,519.7 | -17,406.3 | -2.60% | 323 | 3 | 2,117 | 227,995 | 2,063 | 222,173 |
| 3 | 6/1/2003 | 6/30/2003 | 30 | 784,871.5 | 750,815.4 | 750,815.4 | 725,123.5 | -25,691.9 | -3.50% | 83 | 100 | 9,045 | 7,508 | 8,736 | 7,251 |
| 4 | 7/1/2003 | 7/31/2003 | 31 | 837,213.0 | 824,022.5 | 824,022.5 | 784,421.8 | -39,600.7 | -5.00% | 2 | 198 | 412,011 | 4,161 | 392,210 | 3,961 |
| 5 | 8/1/2003 | 8/31/2003 | 31 | 805,545.7 | 812,302.7 | 812,302.7 | 792,387.4 | -19,915.3 | -2.50% | 1 | 255 | 812,302 | 3,185 | 792,387 | 3,107 |
| 6 | 9/1/2003 | 9/30/2003 | 30 | 736,733.9 | 735,391.0 | 735,391.0 | 703,064.5 | -32,326.5 | -4.60% | 124 | 70 | 5,930 | 10,505 | 5,669 | 10,043 |
| 7 | 10/1/2003 | 10/31/2003 | 31 | 679,776.7 | 696,020.8 | 696,020.8 | 699,181.7 | 2,560.9 | 0.40% | 517 | 0 | 1,347 | 0 | 1,352 | 0 |
| 8 | 11/1/2003 | 11/30/2003 | 30 | 631,789.9 | 625,303.8 | 625,303.8 | 620,304.9 | -4,998.9 | -0.80% | 720 | 0 | 868 | 0 | 861 | 0 |
| 9 | 12/1/2003 | 12/31/2003 | 31 | 654,404.8 | 670,432.3 | 670,432.3 | 628,554.2 | -41,878.1 | -6.70% | 1,041 | 0 | 644 | 0 | 603 | 0 |
| 10 | 1/1/2004 | 1/31/2004 | 31 | 719,377.5 | 703,432.9 | 703,432.9 | 658,299.8 | -45,133.1 | -6.90% | 1,366 | 0 | 514 | 0 | 481 | 0 |
| 11 | 2/1/2004 | 2/29/2004 | 29 | 622,334.1 | 620,424.9 | 620,424.9 | 618,951.6 | -1,473.3 | -0.20% | 1,053 | 0 | 589 | 0 | 587 | 0 |
| 12 | 3/1/2004 | 3/31/2004 | 31 | 689,000.1 | 635,783.2 | 635,783.2 | 646,293.1 | 10,510.0 | 1.60% | 755 | 0 | 842 | 0 | 856 | 0 |

Notes:
1. Baseline1 is weather-adjusted simulation based of actual energy use data from 1/1/02 through 2/28/03. It is adjusted to "This Year's" weather.
2. Baseline2 is weather-adjusted simulation further adjusted by internal changes such as floor area additions, lighting changes, etc.
3. "This Year" is the period from 4/1/03 to 3/31/04
4. "HDD" = Heating degree-days  "CDD" = Cooling degree-days.
5. Values in Blue represent partially filled and empty Date Ranges

Figure 8

| BP ID: | Totals | 1 | 2 | 3 | 4 | 5 | 6 | 7 | 8 | 9 | 10 | 11 | 12 |
|---|---|---|---|---|---|---|---|---|---|---|---|---|---|
| Date From: | 1/1/03 | 1/1/03 | 2/1/03 | 3/1/03 | 4/1/03 | 5/1/03 | 6/1/03 | 7/1/03 | 8/1/03 | 9/1/03 | 10/1/03 | 11/1/03 | 12/1/03 |
| Date To: | 12/31/03 | 1/31/03 | 2/28/03 | 3/31/03 | 4/30/03 | 5/31/03 | 6/30/03 | 7/31/03 | 8/31/03 | 9/30/03 | 10/31/03 | 11/30/03 | 12/31/03 |

Actual On-Going

Actual Consumption [KWH]

| | Totals | 1 | 2 | 3 | 4 | 5 | 6 | 7 | 8 | 9 | 10 | 11 | 12 |
|---|---|---|---|---|---|---|---|---|---|---|---|---|---|
| Off-Peak Cons. | 3,890,156 | 357,033 | 286,153 | 321,740 | 321,564 | 302,596 | 321,570 | 361,686 | 382,151 | 327,390 | 311,739 | 294,622 | 291,903 |
| On-Peak Cons | 3,103,348 | 265,616 | 218,631 | 237,694 | 262,926 | 242,333 | 273,289 | 311,391 | 307,674 | 280,450 | 277,776 | 203,010 | 222,558 |
| Total | 6,993,503 | 622,649 | 504,784 | 559,434 | 584,490 | 544,929 | 594,860 | 673,077 | 689,834 | 607,840 | 589,515 | 497,633 | 514,460 |

Actual Demand [KW]

| | Totals | 1 | 2 | 3 | 4 | 5 | 6 | 7 | 8 | 9 | 10 | 11 | 12 |
|---|---|---|---|---|---|---|---|---|---|---|---|---|---|
| Summer Dema | 1,371 | 0 | 0 | 0 | 0 | 0 | 0 | 1,341 | 1,371 | 1,296 | 0 | 0 | 0 |
| Non-Summer | 1,363 | 1,132 | 1,031 | 1,092 | 1,233 | 1,146 | 1,363 | 0 | 0 | 0 | 1,290 | 1,160 | 1,030 |

Figure 10B

| Actual Cost | | | | | | | | | | | | |
|---|---|---|---|---|---|---|---|---|---|---|---|---|
| Off-Peak Cons. | $90,834 | $8,358 | $6,699 | $7,532 | $7,528 | $7,084 | $7,528 | $8,467 | $8,946 | $7,664 | $7,298 | $6,897 | $6,833 |
| On-Peak Cons | $173,756 | $14,872 | $12,241 | $13,309 | $14,721 | $13,568 | $15,301 | $17,435 | $17,227 | $15,702 | $15,553 | $11,367 | $12,461 |
| Summer Dema | $57,071 | $0 | $0 | $0 | $0 | $0 | $0 | $19,095 | $19,516 | $18,460 | $0 | $0 | $0 |
| Non-Summer | $116,608 | $12,594 | $11,480 | $12,159 | $13,725 | $12,753 | $15,167 | $0 | $0 | $0 | $14,356 | $12,911 | $11,461 |
| Tax | $6,358 | $585 | $469 | $527 | $527 | $496 | $527 | $593 | $626 | $536 | $511 | $483 | $478 |
| Total | $444,628 | $36,409 | $30,889 | $33,527 | $36,501 | $33,901 | $39,524 | $45,590 | $46,316 | $42,363 | $37,718 | $31,657 | $31,234 |

Figure 10C

| Baseline | | | | | | | | | | | | |
|---|---|---|---|---|---|---|---|---|---|---|---|---|
| AdjustFactor | | 1 | 1 | 1 | 1 | 1 | 1 | 1 | 1 | 1 | 1 | 1 |
| Baseline Consumption [KWH] | | | | | | | | | | | | |
| Off-Peak Cons. | 3,974,862 | 334,397 | 299,214 | 315,067 | 293,367 | 318,820 | 346,315 | 377,562 | 388,956 | 340,436 | 317,810 | 321,321 | 321,597 |
| On-Peak Cons | 3,100,062 | 257,034 | 233,365 | 232,786 | 247,635 | 247,892 | 278,871 | 301,662 | 295,790 | 272,103 | 273,281 | 213,625 | 246,018 |
| Total | 7,074,924 | 591,431 | 532,579 | 547,854 | 541,002 | 566,711 | 625,187 | 679,224 | 684,747 | 612,539 | 591,091 | 534,946 | 567,615 |
| Baseline Demand [KW] | | | | | | | | | | | | |
| Summer Dema | 1,362 | 0 | 0 | 0 | 0 | 0 | 0 | 1,286 | 1,362 | 1,232 | 0 | 0 | 0 |
| Non-Summer | 1,316 | 1,098 | 1,083 | 1,039 | 1,149 | 1,136 | 1,316 | 0 | 0 | 0 | 1,131 | 1,049 | 1,046 |

Figure 10D

| Baseline Cost | | | | | | | | | | | | |
|---|---|---|---|---|---|---|---|---|---|---|---|---|
| Off-Peak Cons. | $83,052 | $7,828 | $7,005 | $7,376 | $6,868 | $7,464 | $8,107 | $8,839 | $9,105 | $7,970 | $7,440 | $7,522 | $7,529 |
| On-Peak Cons | $186,004 | $15,422 | $14,002 | $13,967 | $14,858 | $14,873 | $16,732 | $18,100 | $17,747 | $16,326 | $16,397 | $12,817 | $14,761 |
| Summer Dem | $65,261 | $0 | $0 | $0 | $0 | $0 | $14,645 | $0 | $0 | $17,546 | $0 | $0 | $0 |
| Non-Summer | $111,817 | $12,221 | $12,055 | $11,567 | $12,785 | $12,644 | $0 | $0 | $0 | $0 | $12,584 | $11,677 | $11,638 |
| Tax | $6,514 | $548 | $490 | $516 | $481 | $522 | $568 | $619 | $637 | $558 | $521 | $527 | $527 |
| Total | $462,647 | $36,019 | $33,552 | $33,426 | $34,992 | $35,504 | $40,052 | $45,874 | $46,889 | $42,400 | $36,941 | $32,544 | $34,454 |

Figure 10E

| Savings | | | | | | | | | | | |
|---|---|---|---|---|---|---|---|---|---|---|---|
| Energy Savings | | | | | | | | | | | |
| Consumption | 91,421 | -31,218 | 27,795 | -11,981 | -43,488 | 21,782 | 30,327 | 6,147 | -5,088 | 4,700 | 1,576 | 37,313 | 53,154 |
| Demand | -558 | -34 | 52 | -53 | -84 | -10 | -47 | -55 | -8 | -64 | -159 | -111 | 16 |
| Cost Savings | | | | | | | | | | | |
| Net Savings | $8,019 | $-390 | $2,663 | $-101 | $-1,509 | $1,603 | $1,528 | $284 | $373 | $37 | $-776 | $886 | $3,221 |

Figure 10F

WEATHER DATA QUALITY CONTROL AND RANKING METHOD

PRIORITY AND CROSS-REFERENCE TO RELATED APPLICATION

This application claims priority under 35 U.S.C. § 119(e) to provisional application Ser. No. 60/647,100, filed on Jan. 26, 2005, and co-pending non-provisional application Ser. No. 11/118,598 filed on Apr. 18, 2005, entitled ENERGY AND COST SAVINGS CALCULATION SYSTEM, which are incorporated in their entirety herein.

FIELD

The present invention relates generally to systems for monitoring energy use parameters within a building. More particularly, the present invention relates to systems for predicting thermal and power use conditions to be encountered by a building and by virtue of comparing the predicted conditions with actual conditions, the energy and cost savings may be determined.

BACKGROUND

Most commercial properties include a number of building systems that monitor and regulate various functions of the building for the comfort and well-being of the occupants. These building systems include security systems, fire control systems, elevator systems, and/or building environmental system.

A building environmental system regulates the temperature and flow of air throughout a building. The air conditioning for a building typically includes one or more chillers for cooling air and one or more heaters for heating air. Fans distribute air conditioned by a chiller or a heater into a duct system that directs the flow of air to the various rooms of a building. Dampers located within the duct system may be opened or closed by actuators. Also, the speed of a motor that drives a fan is controlled to regulate air flow within the system. An important component of a building environmental management system is the control system that varies the fan motor speed and the position of the various dampers to maintain the desired conditions within the building.

Energy Service Companies (ESCO) currently undertake projects, frequently referred to as performance contracts, which guarantee a specific level of performance for building environmental systems sold to clients. The performance relates to improved facility operations which generate reduced operating costs for the client. The ESCO typically identifies the amount of reduction in operating cost which will occur, i.e., the energy or cost savings, but also may guarantee to the client that the energy or cost savings will occur. After installation of a building environmental system or energy conservation measure, to verify that the energy and cost savings are actually occurring, the energy usage of the facility after the retrofits is compared to the energy usage prior to the retrofits.

However, conventional computer software packages that calculate the energy and cost savings have only a limited number of variables that can be applied to reflect weather and usage changes. For example, energy and cost savings software may be limited to accepting only monthly utility or meter data. As a result, the conventional computer software packages produce energy and cost savings calculations that may have unacceptably high error rates. Unreliable energy and cost savings calculations may prevent the accurate calculation of energy and cost savings for energy conservation measures and building environmental systems installed at customer locations. Thus, the energy and money saved by the energy conservation projects, such as the savings required by a performance contract, cannot be easily and reliably proven. Inaccurate cost savings calculations also may hinder reliable financial planning as the actual amount of energy expended, as well as the associated cost for each unit of energy, cannot be timely ascertained.

Furthermore, weather data providers may supply weather data that includes inaccurate or incomplete weather parameter data. Inaccurate or incomplete weather parameters may lead to problems for the users of the weather data, such as unreliable energy and cost savings calculations.

BRIEF SUMMARY

A method and system for performing quality control checks upon weather data are provided. The weather data includes information pertaining to a plurality of weather parameters. The quality control checks identify inaccurate weather parameters. The quality control checks include hourly, daily, and forecast quality control checks performed upon hourly, daily, and/or forecast weather parameter data.

The method and system may exclude the inaccurate weather parameters identified from a weather database. The method and system also may determine reasonable weather parameters that approximate the actual weather parameters and are used to replace the inaccurate weather parameters. The method and system also may rank a plurality of sources providing weather data to identify the most accurate weather data.

In one embodiment, a method of quality control for weather data is provided. The method includes receiving weather data from at least one weather data provider, the weather data includes information pertaining to a plurality of weather values, and automatically identifying inaccurate weather values.

In another embodiment, a method of quality control for weather data is provided. The method includes receiving a plurality of weather data sets, each weather data set includes information pertaining to a plurality of weather values, identifying inaccurate weather values, and ranking the weather data sets based upon the accuracy of the respective weather values.

In another embodiment, a system for identifying inaccurate weather parameters is provided. The system includes a processor operable to receive weather data and perform a quality control check on the weather data, the weather data includes information pertaining to a plurality of weather parameters and the quality control check identifies erroneous weather parameters.

In yet another embodiment, a computer-readable medium having instructions executable on a computer stored thereon is provided. The instructions include receiving a plurality of weather data sets, each weather data set including information pertaining to a plurality of weather values and ranking the weather data sets based upon the accuracy of the respective weather values.

Advantages of the system will become more apparent to those skilled in the art from the following description of the preferred embodiments of the invention which have been shown and described by way of illustration. As will be realized, the system is capable of other and different embodiments, and its details are capable of modification in various respects. Accordingly, the drawings and description are to be regarded as illustrative in nature and not as restrictive.

BRIEF DESCRIPTION OF THE DRAWINGS

FIG. 7 illustrates an exemplary weather and energy report;

FIG. 8 illustrates an exemplary comparative energy use report that displays weather-adjusted comparisons;

FIGS. 10A through 10F illustrate an exemplary annual meter report; and

DETAILED DESCRIPTION

Figure 1:
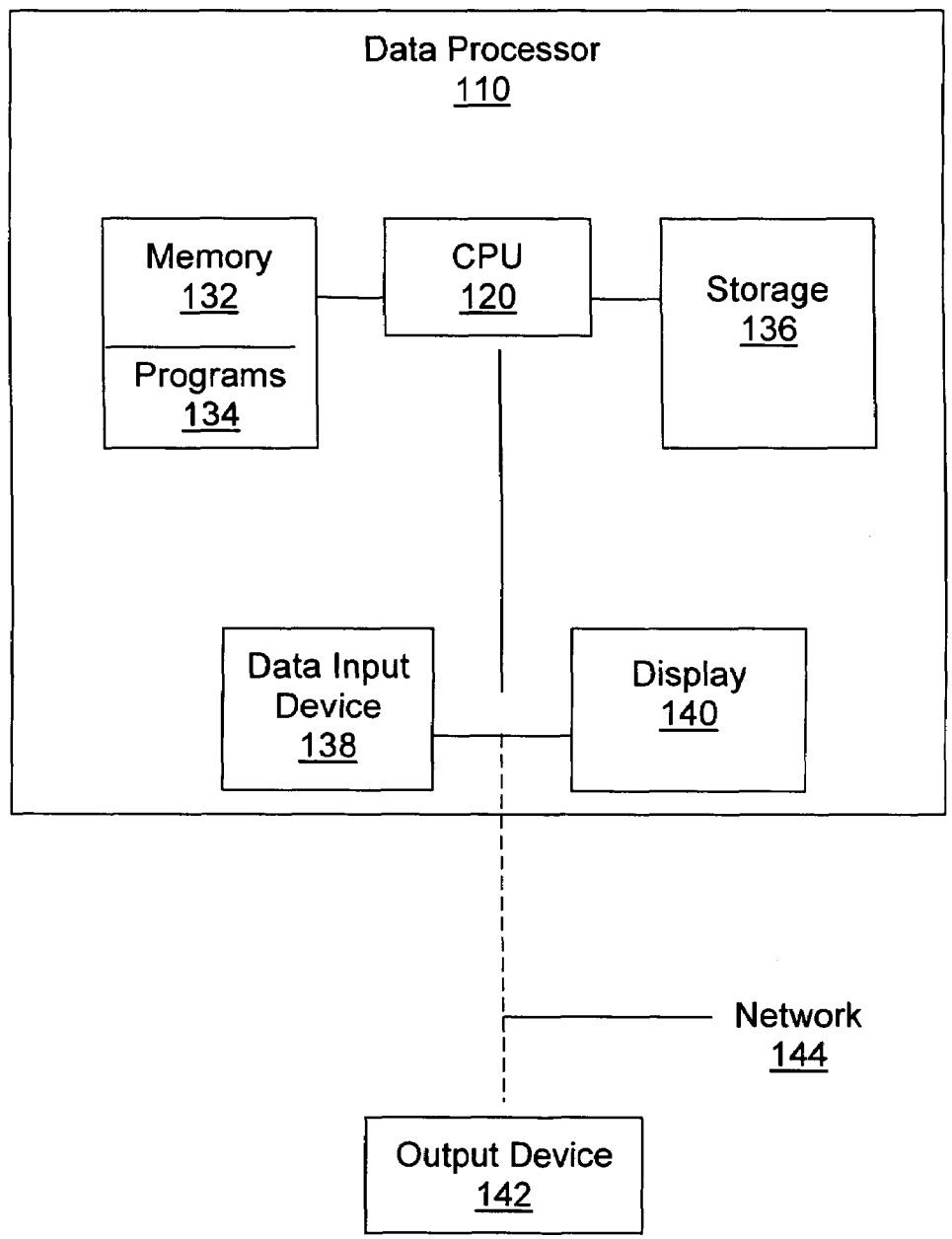
FIG. 1 illustrates an exemplary data processor configured or adapted to provide the functionality of the Energy and Cost Savings Calculation System.

The Energy and Cost Savings Calculation System provides Multi-Variant, Non-Linear (MVNL) load forecasting techniques, energy and cost savings calculations, and Weather Ranking. The Energy and Cost Savings Calculation System forecasts energy and cost savings for energy conservation measures installed at customer locations. The system may support the performance of the contracting business by enhancing the evaluation of performance contracts. For instance, the system may reduce the amount of labor expended in calculating the energy and cost savings associated with performance contracts. Additionally, the system provides customers with a manner by which to prove that the energy conservation projects are actually saving energy and money. The system may reside on a global energy information platform.

The Energy and Cost Savings Calculation System provides regular updates of the savings progress. The system also may calculate actual project slip, as well as forecast project savings and slip into the future. Furthermore, the system may calculate energy and cost savings using utility bills and/or simulations for a Basic Reference Period. The same simulation tool used to establish the Baseline also may be used for the calculation of energy and cost savings.

Load forecasting or calculating is the prediction of building energy usage (i.e., electricity, gas, steam, etc.) based upon external parameters. For example, load forecasting applications may calculate cost savings of conservation measures and projects. Performance contracts often include provisions to verify promised energy and cost savings. Verification of savings may be accomplished by establishing a base or reference period representing energy usage patterns before the conservation measures of the performance contract were implemented. For several years after the conservation measures have been initiated, the energy usage during the Baseline period is compared to the on-going energy usage of the facility.

Load forecasting may be used in monitoring and verification (M&V) calculations and calculating future loads, as well as used to spot abnormalities and compare energy usage for the current year with the previous year or other time period. Load forecasting also may be used to predict a daily expected consumption and peak, either of which may be useful when compared against the actual daily consumption and peak data to warn of near-term faulty operation. A five-day or other period daily consumption and peak load forecast may provide valuable operational information to warn against future excessive loads.

I. Adjustments

A comparison of the current year's operation with the previous year's operation is one yardstick of operational efficiency and may evidence "continuous improvement" as suggested by ISO-14001 standards. However, there are inevitably a number of year-to-year changes. Of course, the weather is not identical for any substantial length of time from one year to the next. Additionally, the use or primary purpose of a facility may deviate, internal changes may have been made to a facility, or one or more building additions may have been completed. Therefore, the comparison of the present year to the previous year may need adjustments to be reliable, such as adjustments for weather differences, operational changes, internal load changes, and building additions.

The cost savings associated with energy conservation projects are often of keen interest to management involved in making such changes. The verification of energy and cost savings may involve all of the various parameters discussed above, or others, such as energy rates. Rates may be simple, such as "cost per unit consumed," or more complex and involve time-of-use elements (e.g., on-peak, off-peak, and shoulder electric rates), demand charges, rate holidays, real-time rates, ratchets, block structures, and taxes. Rates may be the same for the base period and the present period or the rates may vary. Within either the base or the present period, the rate may have sub-rates that change each month.

II. Non-Linear Regression

Load forecasting based upon Multi-Variant Non-Linear (MVNL) technology has a much smaller error per time period than that of popular linear regression techniques. The load forecasting may be performed by Multi-Variant Non-Linear modeling based upon interval data, such as interval data received directly from meters associated with a portion of a building or individual pieces of equipment.

The MVNL technique may employ Baselines, Baseline Extensions, Reporting Periods, Basic Reference Periods, and Reference Period Modifications, as defined herein. A Baseline refers to the energy use characteristics in the period of time against which energy savings will be measured. A Baseline is usually between one and three consecutive years.

In the context of the MVNL technology, a Baseline Extension refers to what the energy use would be in a time other than the Baseline period of time if it had the same characteristics. The Baseline may be extended both forward and backwards in time by the Baseline Extension.

A Reporting Period refers to the smallest period of time in which energy and cost savings are disclosed. For example, an annual report with savings disclosed monthly would have a Reporting Period of one month.

A Basic Reference Period refers to the period of time within the Baseline whose weather conditions most closely resemble those of the Reporting Period. For example, if the Baseline is the calendar year 2004 and the Reporting Period is July 2005, then the Basic Reference Period is July 2004.

A Reference Period Modification refers to a modification of the Basic Reference Period. At times, the best weather fit requires the Basic Reference Period to be adjusted. There are several techniques to modify the Basic Reference Period. One such technique is to add days on both sides to better represent the weather found in the Reporting Period. Alternate Reference Period Modifications also may be used.

More specifically, the MVNL load forecasting may include the use of multiple Reference Periods within the Baseline to further reduce the error between the forecast and the actual energy loads. The MVNL load forecasting technique also may use Reference Period Modifications as needed. Reference Period Modifications may enhance the capture of the range of an external parameter during the reporting period, such as the outside air temperatures (OAT). An accurate representation of the outside air temperature is desirable because the outside air temperature is a major contributor to building thermal loads. For example, a change in the average monthly temperature of five or ten degrees will impact actual loads.

Reference Period Modifications may compensate for deviations in outside air temperatures from year to year. An overall benchmark, or Baseline, may be established from weather and energy usage data collected over one or more years. The Baseline may be divided into Basic Reference Periods corresponding to specific time periods. For instance, each calendar month may be a separate Basic Reference Period, and each Basic Reference Period may have a separate temperature range.

A Basic Reference Period is intended to be based upon weather data that approximately matches the weather experienced during the current reporting period. If the weather from the Basic Reference Period and the current reporting period approximately match, the energy usage associated with the Basic Reference Period may be used as a starting point in calculating the energy usage during the current reporting period.

Ideally, one would be able to simply use the corresponding month within the Baseline as the Reference Period. However, the weather deviates from year to year.

Accordingly, if the outside air temperature of the current reporting period is outside the Basic Reference Period temperature range, the Basic Reference Period may be adjusted by a Reference Period Modification. The Reference Period Modification is intended to more accurately reflect the weather and the accompanying effect of the weather on energy usage. The Basic Reference Period may be extended, either further into the past and/or into the future, until the outside air temperature range of the current reporting period falls within the Modified Reference Period temperature range. The Basic Reference Period may be widened by a month on either side. The Basic Reference Period also may be widened by a specific number of days on either side. Alternatively, the Basic Reference Period may consist of selected discontinuous days within a Baseline or a Baseline Extension to more accurately reflect the weather and the accompanying effect of the weather on energy usage.

The MVNL load forecasting technique may use the dew point temperature as an external parameter or input item. The dew point temperature indicates the moisture in the air. The dew point temperature contributes load to an air conditioning system, especially during the summer months.

The MVNL load forecasting technique also may use solar conditions as an external parameter. The effect of the sun is a major contributor to building thermal load. Solar conditions may be received from weather data providers, such as: sunny, partly sunny, overcast, partly cloudy, cloudy, scattered clouds, light rain, showers, haze, mist, clear, snow, or the like. Each solar condition may be assigned a corresponding weighting coefficient. A weighting coefficient may be larger for the amount of sunlight on a given day. In one embodiment, a solar condition of sunny may be assigned a weighting coefficient of 1.0, while a solar condition of a rainy day may be assigned a weighting coefficient of 0.3. In another embodiment, the solar condition may be derived from the "Condition" term provided by the National Weather Service (NWS), which may be parsed to determine a weighting coefficient reflecting the amount of sun received. However, additional or different solar conditions and corresponding weighting coefficients also may be used.

Furthermore, the load forecasting technique may use the type of day as an input item. The type of day, such as being a weekday, a weekend, or a holiday, may be a major determinant of the energy usage in a building. A building may be presumed to be substantially occupied on a weekday and primarily unoccupied on a weekend or a holiday. The occupancy of a building typically has an effect the energy usage of the building.

The Energy and Cost Savings Calculation System may provide for energy cost savings. The Baseline energy usage may be arranged to support time-of-use (TOU) electric rates. Load forecasts may be prepared for each TOU period of the day. Separate TOU periods may be available for consumption and demand elements of the Rate. Additionally, the system may calculate energy savings using complex rates. For example, on-peak, shoulder, and off-peak consumption periods may be supported by the cost savings calculation. Demand windows also may be supported.

The Energy and Cost Savings Calculation System may provide for Weather Ranking. The weather data may be ranked to improve load forecasting accuracy. For example, errors and anomalies may be present in the NWS weather data. Errors and anomalies also may be present in weather data provided by other sources. The system may identify errors from the various sources, rank the sources, and select the source with the most accurate data.

The Energy and Cost Savings Calculation System may provide more accurate load forecasts than linear regression techniques, in part, by using more types of data than conventional linear regression techniques. Alternatively, the system may provide more accurate load forecasts by analyzing the accuracy of any data received and not accepting erroneous data.

The system may receive multiple data input streams, such as weather and energy data. The energy data may be interval data received from meters, from utility bills or simulations. The system also may use billing determinants and complex rates to calculate the cost and cost savings. Savings may be updated daily, and the results may be presented without a calculation error substantially distorting the results.

Additionally, the system may enhance accuracy by accepting energy use data for intervals smaller than monthly time periods (such as utility bills), which permits a larger number of variables to be utilized. For example, during testing, the MVNL load forecasting technology using daily data has proven to be approximately thirty times more accurate than utility bill-based linear regression techniques. The error rates associated with MVNL load forecasting using monthly Reporting Periods may be small enough such that approximate monthly energy and cost savings may be calculated. On the other hand, the monthly error rates associated with monthly utility bill-based linear regression calculating tend to distort the monthly results.

The Energy and Cost Savings Calculation System may enable many types of energy cost comparisons. The system may have two modes of operation. The first mode of operation may analyze energy usage and cost. The first mode may be manual and built upon case studies. The case studies may include evaluating variations in the rates, energy loads, equipment efficiency, operational changes, and facility additions. For example, the system may be run in the first mode to evaluate a new electric rate or to simulate the performance of changing aspects of plant operations, such as replacing chillers, fans, boilers, or other equipment.

The second mode of operation may monitor and calculate the energy and cost savings. The second mode may be on-going and automatic. For instance, the system may be run in the second mode to automatically report on the energy and cost savings of a performance contract.

III. Adjusted Cost Technology

The Energy and Cost Savings Calculation System may employ Adjusted Cost Technology (ACT). The Adjusted Cost Technology software may perform ad-hoc studies and present energy and rate analysis based upon one or more variables. The software may be used to generate monitoring and verification annual reports. Several energy data feeds may be accepted by the software. The Adjusted Cost Technology software has three primary elements, as illustrated in TABLE I below. The primary elements may be characterized as related to Adjusted, Energy, and Rate information. Additional, fewer, or alternate primary elements also may be used.

TABLE I

Adjusted Cost Technology (ACT)

| | |
|---|---|
| ADJUSTED | Loads may be modified to simulate different conditions. There may be two types of adjustment.<br>1. Baseline Extensions. Baseline extensions are due to changes in weather or occupancy. Using MVNL technology, these adjustments use the characteristics of energy usage during one period of time and apply it to the weather of another time period. It answers the question: "What would the energy usage be for the current time period if the energy system change had not been made?"<br>2. Scheduled Proportional Adjustments to Baseline Extensions. Scheduled proportional adjustments consider additions to buildings. The date rate adjustments become effective also may be taken into consideration. |
| ENERGY | Several data sources are considered<br>Interval data from automatically read meters<br>Utility bill data<br>Simulation<br>Manually read meter data<br>Time-of-Use energy use breakouts |
| RATE | Complex rates are considered. Complex rates may include time-of-use data, peak values, reactive power penalties, seasonal rate changes, fees, and taxes. |

The adjusted information may include modifying loads to simulate different conditions. There may be two types of adjustment. The first type of adjustment may be a Baseline Extension. The Baseline Extensions may take changes in weather or occupancy into consideration. By using MVNL technology, a Baseline Extension adjustment may apply the characteristics of energy usage during one time period to the weather of another time period. The Baseline Extension may be designed to determine what the energy usage would have been during the current year without a change in the energy system. Baseline Extensions may extend forward and backward in time.

The second type of adjustment may be a schedule proportional adjustment to a Baseline Extension. The schedule proportional adjustments may take into consideration building additions, demolitions, or expansions. The scheduled proportional adjustments also may reflect the date of rate adjustments becoming effective.

The energy information may take several data sources into consideration. The data sources may include interval data, utility bill data, simulation, and manually read meter data. The interval data may originate from automatically read meters.

The rate information may take complex rates into consideration. The complex rates may be determined in part by time-of-use data, peak values, reactive power penalties, seasonal rate changes, fees, and taxes.

Load forecasting technology has a number of applications. The applications may relate to (1) the quality control of data, (2) five-day forecasts, (3) weather-adjusted comparisons, (4) comparison of energy usage to a static, weather-adjusted Baseline, (5) calculation of cost savings that result from conservation measures, and (6) calculation of the cost of wasteful operations. The quality control of data may involve comparing expected values with actual values. The five-day forecast applications may include demand and consumption forecasts. The weather adjusted comparison applications may compare the current time period with a previous time period, such as the current year with last year or the current quarter or month with the same quarter or month of a previous year. Additional, fewer, or alternate applications also may utilize load forecasting technology.

The Energy and Cost Savings Calculation System may generate a number of detailed reports. For instance, load forecasting applications may compare a forecast with the actual data. In one application, energy usage data and reports may be sent electrically, such as by email, to customers. The application may use load forecasting technology to determine if the data collected is reasonable. Other reports may include comparative energy reports, rolling annual meter reports, rolling annual reports, performance contract project rolling annual reports, life of performance contract project reports, and various ad hoc roll-up reports.

IV. Exemplary Embodiments

FIG. 1 illustrates an exemplary data processor 110 configured or adapted to provide the functionality of the Energy and Cost Savings Calculation System. The data processor 110 includes a central processing unit (CPU) 120, a memory 132, a storage device 136, a data input device 138, and a display 140. The processor 110 also may have an external output device 142, which may be a display, monitor, a printer or a communications port. The processor 110 may be interconnected to a network 144, such as an intranet, the Internet, or an intranet connected to the Internet. The data processor 110 is provided for descriptive purposes and is not intended to limit the scope of the present system. The processor may have additional, fewer, or alternate components.

A program 134 may reside on the memory 132 and include one or more sequences of executable code or coded instructions that are executed by the CPU 120. The program 134 may be loaded into the memory 132 from the storage device 136. The CPU 120 may execute one or more sequences of instructions of the program 134 to process data. Data may be input to the data processor 110 with the data input device 138 and/or received from the network 144. The program 134 may interface the data input device 138 and/or the network 144 for the input of data. Data processed by the data processor 110 is provided as an output to the display 140, the external output device 142, the network 144 and/or stored in a database.

Figure 2:
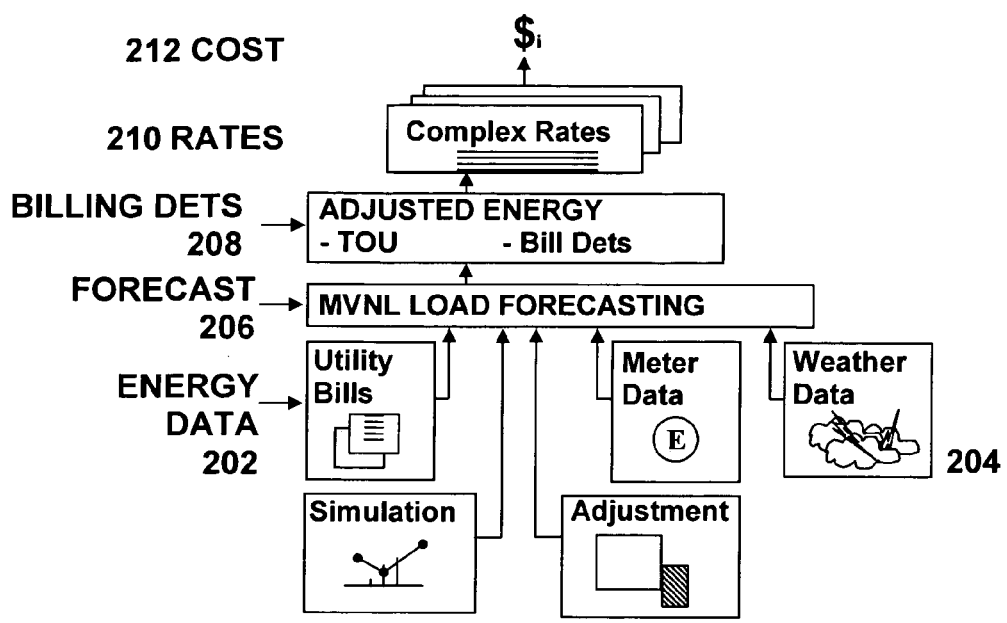
FIG. 2 is a schematic representation an adjusted cost system employed by the Energy and Cost Savings Calculation System.

FIG. 2 is a schematic representation of the Adjusted Cost Technology 200 employed by the Energy and Cost Savings Calculation System. As shown, in one embodiment, the system may receive energy data 202 and weather data 204 as input. The energy data 202 may originate from utility bills, simulations, adjustments, and/or meters. The weather data 204 may originate from a weather data provider, such the National Oceanic and Atmospheric Administration (NOAA). The energy data 202 and weather data 204 may be used by a processor that performs load forecasting 206, such as MVNL load forecasting. The processor subsequently may use billing determinants 208 to adjust the load forecasting 206. The billing determinants 208 may include adjusted energy rates, such as energy rates adjusted for time of use. The processor may further adjust the load forecasting 206 based upon complex rate schedules 210 to determine a cost 212 or cost savings.

Figure 3:
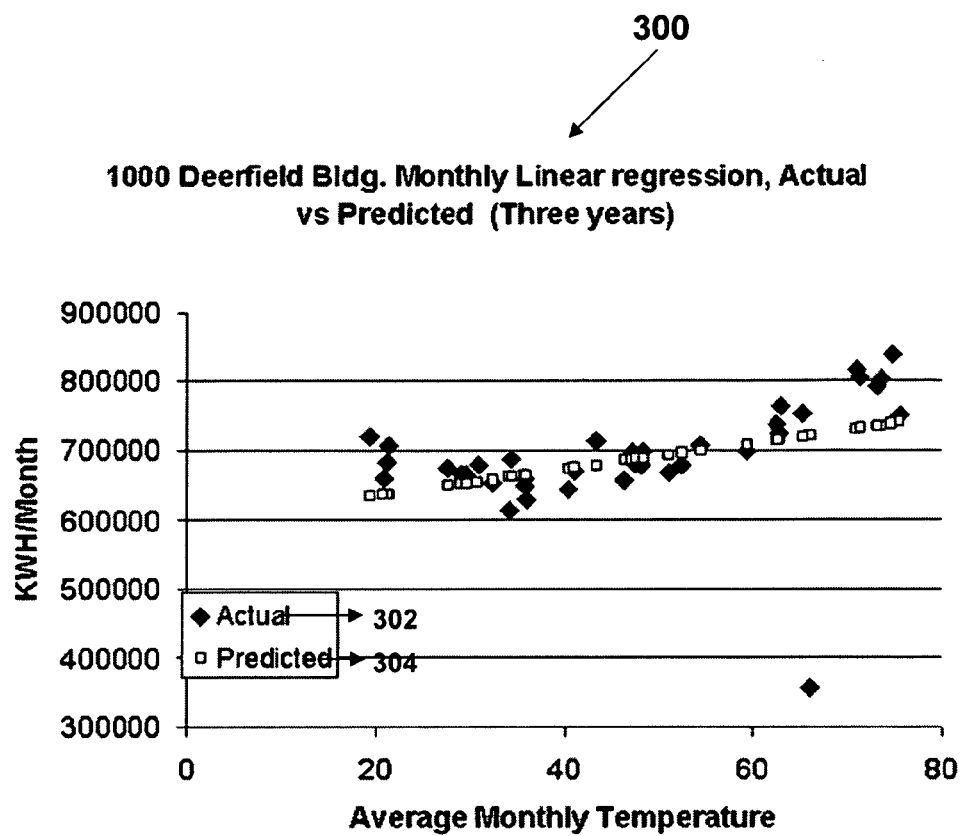
FIG. 3 illustrates an exemplary monthly linear regression load forecasting technique.

FIG. 3 illustrates an exemplary monthly linear regression load forecasting technique. For the example shown, the monthly energy usage was taken from utility bills. Daily high and low dry-bulb temperature data was obtained from the NWS. Subsequently, the monthly energy usage was compared to the average monthly outside air dry bulb temperature by means of a linear regression.

As shown by FIG. 3, the linear regression technique 300 plots a best fit straight line through the data points. Accordingly, the accompanying monthly error may be rather large. However, the error associated with linear regression may be reduced as the Reporting Period time increases. For example, the error trends towards zero as the Reporting Period increases to one year. Still, due to the errors associated with shorter time periods, the usefulness of a linear regression technique may be limited to calculating annual energy usage and savings.

More specifically, FIG. 3 shows actual loads 302 versus predicted loads 304 using a monthly liner regression technique 300 over a three year period. The predicted loads 304 are represented by square icons. The actual loads 302 are represented by diamond icons. As shown, the linear regression technique 300 provides an approximately straight line of the predicted load data 304 through the actual load data 302. The monthly linear regression technique 300 illustrated also utilized the average monthly temperature.

On the other hand, as noted above, MVNL load forecasting may use a number of different input variables or external parameters to forecast energy loads. For example, the input variables may include daily weather data, operational data, calendar data, and time-of-use data.

Figure 4:
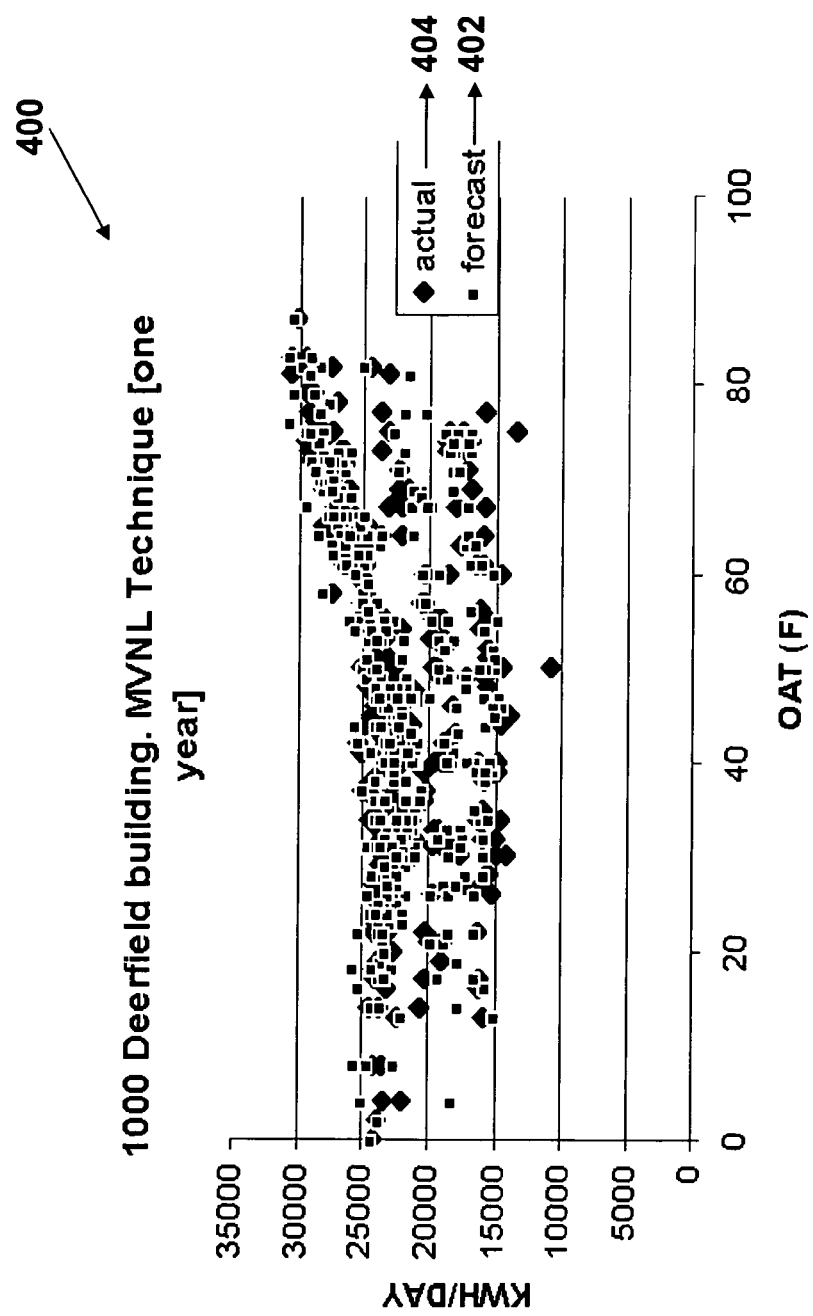
FIG. 4 illustrates an exemplary MVNL load forecasting technique.

FIG. 4 illustrates an exemplary MVNL load forecasting technique 400. The MVNL technique 400 shown uses the following as input: (1) daily weather data, (2) operational data, (3) calendar data, and (4) time-of-use data. The daily weather data may include dry-bulb temperature, dew point temperature, and solar condition data. The operational data may include type of use data, such occupied or unoccupied information. The calendar data may identify the day of week, the day of year, or the week of the year. The time-of-use data may include daily energy consumption data and daily energy peak data. Additional, fewer, or alternate external parameters may be utilized by the MVNL load forecasting technique 400.

An exemplary MVNL load forecasting technique is illustrated in Table II below. The MVNL load forecasting technique shown receives weather data corresponding to a number of weather parameters or variables and performs a simultaneous best fit solution for all of the variables, and subsequently generates a number of coefficients or constants to be determined corresponding to each weather parameter.

In particular, the exemplary load forecasting technique accepts data for a number of weather related variables. The weather related variables include AvgDayTemp (the average daily outside air temperature), SolarIndex (a measure of sunniness, the solar index varies between 0.3 and 1.0 depending on the amount of sunshine received during the day), Dewpoint (the average daily dew point temperature), DayType (a value that is 1 for weekdays and 0 for weekends and holidays), DayOfWeek (a number between 1 and 7, starting with 1 for Monday and ending with 7 for Sunday), and DayOfYear (a number between 1 and 366, starting with 1 for January $1^{st}$ and continuing sequentially throughout the days of the year). Data pertaining to additional, fewer, or alternative weather related variables also may be accepted as input.

TABLE II

Exemplary MVNL Load forecasting Technique

Multi-Variable, Non-Linear Model.
Used to Calculate Building Energy Values (Demand or Consumption)
A. Independent Variables:
    Avg DayTemp - Average Daily outside Air temperature
    SolarIndex - Solar Index, a measure of "sunniness". Index varies between 0.3 and 1.0 depending
      on the amount of sunshine received during the day.
    Dewpoint - Average daily dew point temperature
    DayType - A value which is 1 for weekdays and 0 for weekends/holidays.
    DayOfWeek - Day of week number (varies between 1 and 7, where Monday=1,etc)
    DayOfYear - Day of year number (varies between 1 and 366, where January 1st=1,etc)
B. Constants to be determined.
    $C_{01}$, $C_{11}$, $C_{21}$, $C_{31}$, $C_{02}$, $C_{12}$, $C_{22}$, $C_{32}$, $D_0$, $S_0$, $T_0$, $W_0$, $Y_0$,
C. Equations
    1. Dewpoint:
      If "Dewpoint" is unknown, then simulate it with the following equation:
      Dewpoint =
        −0.996117744−0.429185771* MinDayTemp−0.642669651* MaxDayTemp +
        2.04489578* AveDayTemp − 11.2521308 * SolarIndex + 0.00509644 * DayOfYear;
    2. Building Energy Value:
      X = (Avg DayTemp + $S_0$*SolarIndex * DayType)
      Building Energy Value = [Limit Building Energy value to a positive number]
        $D_0$*Dewpoint              [for range of effectiveness]

TABLE II-continued

Exemplary MVNL Load forecasting Technique $+ C_{01} + C_{11}*X + C_{21}*X^2 + C_{31}*X^3$ [where Temp is less than changeover temp.]
$+ C_{02} + C_{12}*X + C_{22}*X^2 + C_{32}*X^3$ [where Temp is greater than changeover temp.]
$+ T_0*DayType$
$+ W_0*DayOfWeek$
$+ Y_0*\sin((DayOfYear-80)*2*pi/365)$ The constants to be determined in the example shown include $C_{01}$, $C_{11}$, $C_{21}$, $C_{31}$, $C_{02}$, $C_{12}$, $C_{22}$, $C_{32}$, $D_0$, $S_0$, $T_0$, $W_0$, and $Y_0$. $C_{01}$, $C_{11}$, $C_{21}$, and $C_{31}$ are constants associated with a first polynomial equation where temperature is less than the changeover temperature. $C_{02}$, $C_{12}$, $C_{22}$, and $C_{32}$ are constants associated with a second polynomial equation where temperature is greater than the changeover temperature. The changeover temperature is the temperature at which a building heating and cooling system switch, with one becoming operative and the other inoperative. The change over temperature is typically about 65 degrees Fahrenheit. $D_0$ is a constant associated with the dew point temperature. $S_0$ is a constant associated with the solar index. $T_0$ is a constant associated with the type of day. $W_0$ is a constant associated with the day of the week. $Y_0$ is a constant associated with the day of the year. Additional, fewer, or alternative constants also may be determined.

If no dew point temperature data is available, the exemplary load forecasting technique calculates an estimated dew point temperature. The estimated dew point temperature is based upon a dew point constant (−0.996117744 in the example of shown), the minimum day temperature (MinDayTemp), the maximum day temperature (MaxDayTemp), the average day temperature (AvgDayTemp), the solar condition (SolarIndex), and the day of the year (DayOfYear). The MinDayTemp, the MaxDayTemp, the AvgDayTemp, the SolarIndex, and the DayOfYear variables may each be multiplied by a corresponding constant. Additional, fewer, or alternative factors also may be used to estimate dew point temperature.

Subsequently, the exemplary load forecasting technique calculates energy demand or consumption by solving a single equation based upon input data corresponding to the average daily temperature, the type of day (either occupied or unoccupied), the solar condition, the day of the year, the day of the week, and the dew point temperature. Additional, fewer, or alternate variables also may be used to calculate energy demand.

More specifically, as shown in Table II, the exemplary load forecasting technique calculates energy demand or consumption by calculating a variable X that represents the average daily temperature (AvgDayTemp) plus a solar constant ($S_0$) multiplied by the solar condition (SolarIndex) multiplied by the type of day (DayType). The building energy value, representing either demand or consumption, may then be computed. However, the building energy value should be limited to only positive numbers.

In the example illustrated by Table II, the building energy value equals the sum of (1) either the actual or calculated dew point (Dewpoint) multiplied by a dew point constant ($D_0$), (2) a first polynomial equation, (3) a second polynomial equation, (4) the type of day (DayType) multiplied by a day type constant ($T_0$), (5) the day of the week (DayOfWeek) multiplied by a day of the week constant ($W_0$), and (6) a seasonal equation multiplied by a day of the year constant ($Y_0$).

In the example shown, the Dewpoint multiplied by $D_0$ calculation estimates the effect that the dew point has upon energy load and cost, which varies dependent upon the season of the year. The first polynomial equation estimates the effect of the temperature being less than the changeover temperature upon energy load and cost. The second polynomial equation estimates the effect of the temperature being greater than the changeover temperature upon energy load and cost.

Additionally, the DayType multiplied by $T_0$ calculation estimates the effect of building occupancy upon energy load and cost. The DayOfWeek multiplied by $W_0$ calculation estimates the effect of the specific day of the week upon energy load and cost. The seasonal equation multiplied by $Y_0$ calculation estimates the effect of seasonal changes upon energy load and cost.

Moreover, other equations and calculating techniques may be used to calculate energy or cost savings for a building conservation measure. Other non-linear or polynomial regressions may be used other than the example shown in Table II above. For example, a polynomial regression solving for estimated energy load may use any combination of various outside air temperatures, solar conditions, day classifications, or seasonal information as inputs. Additionally, a neural network or other software engine that provides for the simultaneous solution of multiple equations may be used by the Energy and Cost Savings Calculation System.

The MVNL load forecasting technique 400 may produce a small monthly error and the annual error may trend toward zero. The MVNL load forecasting technique 400 may calculate forecast data points 402 that "blanket" or closely reflect the actual data points 404. The blanketing of the data results in part from the additional, as well as the specific, parameters used. The MVNL load forecasting technique may produce a calibrated simulation which solves for energy consumption and peak load in each defined time-of-use period for each day using the above-mentioned inputs. The MVNL technique 400 may be used to forecast daily, weekly, monthly, quarterly, semi-annual, annual, or other time period energy usage.

More specifically, FIG. 4 shows the actual loads 404 versus the forecast loads 402 predicted by the MVNL technique 400 over a one-year period. The actual loads 404 again are represented by diamond icons. The forecast loads 402 are represented by square icons. As shown, the MVNL load forecasting technique 400 approximately mirrors the actual data, providing forecast loads 402 that more accurately predict the actual loads 404.

Table III below provides a comparison of the linear regression and MVNL load forecasting techniques. The linear regression technique may be based upon pre-existing utility bills and rely upon few data elements, resulting in relatively large monthly errors. On the other hand, the MVNL technique may be based upon numerous external parameters for which the data is automatically obtained and updated on a daily basis, which facilitates the production of small monthly errors. For instance, the MVNL technique may use interval data received automatically from meters. In the examples shown, the monthly linear regression error is approximately 32 times larger than the monthly error of the MVNL technique.

TABLE III

Comparison of Load forecasting Techniques

|  | Linear Regression [Monthly Utility Bill-based] | MVNL [Interval Meter Data-based] |
|---|---|---|
| Data Points | One per month | 2900 per month (based on 15-minute interval data) |
| Update Frequency | Monthly | Daily |
| Time Lag | 4–6 weeks to receive the utility bill | 4–6 hours after the end of the day to receive results |
| Load Adjustments Based on: | OA dry bulb temperature | OA dry bulb temperature OA dew point temperature Solar condition Time-of-Use periods Day type (WD/WE/HOL) Day of week Day of year |
| Model | Single variable, linear regression | Multi-variant, non-linear model that reflects how inputs affect facility energy usage |
| Accuracy | Daily Error: Does not apply Monthly Error: ~5%-to-15% Annual Error: ~0%-to-1% | Daily Error: 2%-to-5% Monthly Error: 0.2%-to-0.6% Annual Error: ~0% |

The goal of using any load forecast simulation is to keep the variation between metered and simulated (i.e., "forecast") values sufficiently small so as not to interfere with the application. For example, a simulation error of 1% may be acceptable if one is simply predicting the peak electric load for tomorrow. However, a simulation error of 1% for a load forecast used to calculate energy savings will probably distort the analysis if combined with savings measures that produce actual energy savings between 1 and 2%.

Figure 5:
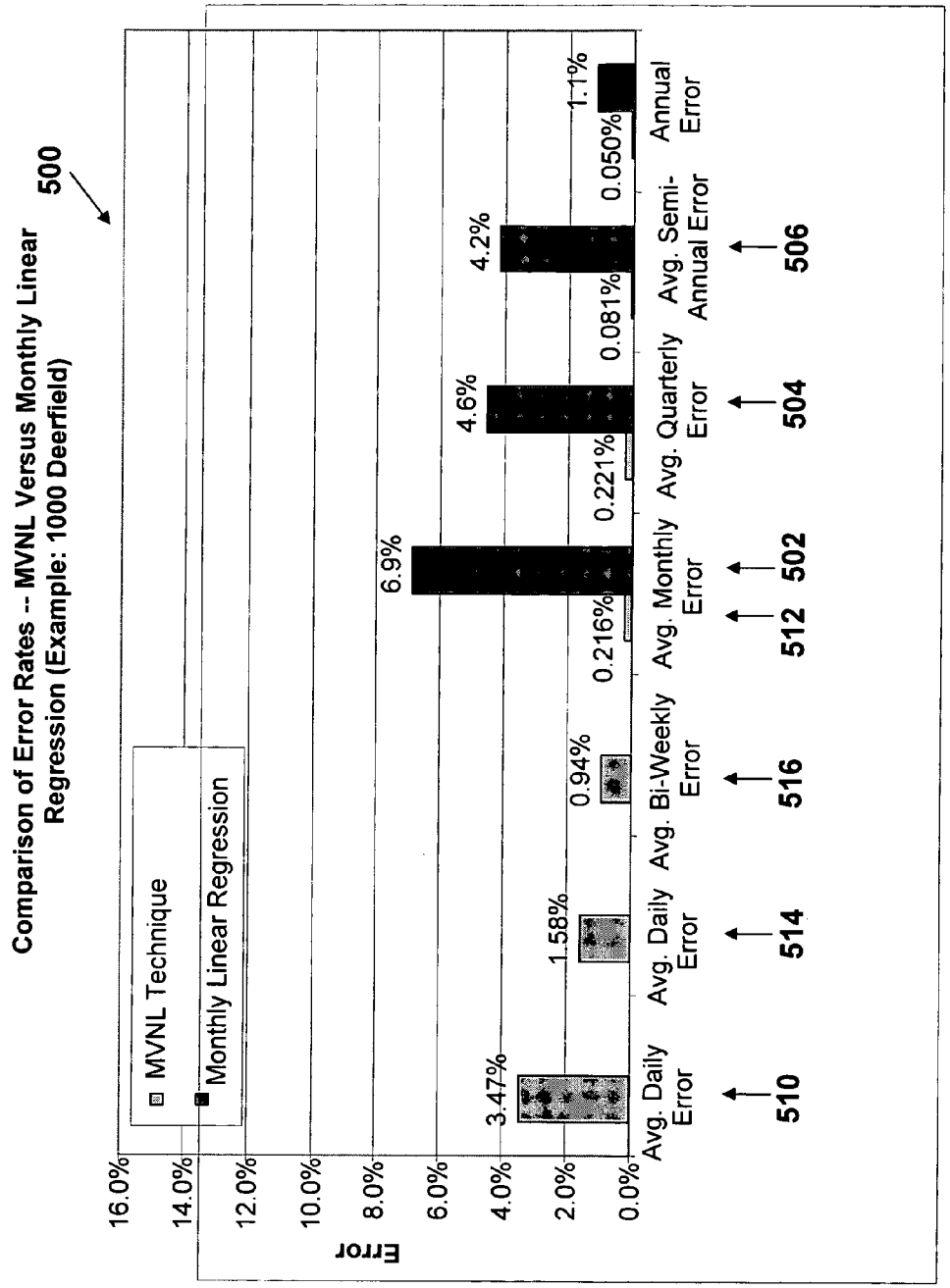
FIG. 5 illustrates a comparison of error rates produced from MVNL and monthly linear regression load forecasting.

FIG. 5 illustrates a comparison of the error rates produced from MVNL and monthly linear regression load forecasting 500. As shown, the average monthly error 502 of conventional linear regression techniques is approximately 7% and the average quarterly error 504 and the average semi-annual error 506 of conventional linear regression techniques may be 4.6% and 4.2%, respectively. Hence, the error rates associated with linear regression techniques may be unacceptable due to the accompanying financial uncertainty. Accordingly, in one embodiment, the Baseline Extension error should be less than 10% of the savings. For example, if savings are 10%, the Baseline Extension error should be 1.0% or less of the savings to avoid distorted results.

FIG. 5 also shows a comparison of the average daily, weekly, bi-weekly, monthly, quarterly, semi-annual, and annual average error rates of the MVNL and linear regression techniques. For an annual calculation, both techniques trend toward 0% error. However, for linear regression techniques, this result may be explained in part because the inaccuracies tend to cancel the effect of each other as the time period is lengthened. Therefore, as more data points are used, the net effect is that the average error is reduced.

Load calculations based upon monthly linear regression techniques may have average errors which distort the energy or cost savings calculations. The MVNL technique, on the other hand, may provide daily updates based upon 15-minute data. The time period for the MVNL technique may be a day. As shown in FIG. 5, the average daily error 510 may be much less than the average monthly error 502 of the monthly linear regression technique. A five-day peak load forecasting application may further reduce the average error to more acceptable levels. Moreover, for comparative energy or cost savings applications, the average monthly error 512 is small enough such that distorted monthly results do not occur or are minimal. In some instances, weekly or bi-weekly data also may be used without severe distortion due to average weekly errors 514 or average biweekly errors 516. Therefore, the MVNL load forecasting technique may produce more accurate energy and cost savings calculations than linear regression techniques.

Furthermore, the MVNL load forecasting technique may utilize interval meter data as an input, while linear regression techniques may be based upon monthly utility bills. The interval data may be obtained after the installation of metering equipment. The metering equipment may provide current data automatically. The readily accessible interval data may contribute to the reduction of the error rates accompanying each time period.

Additionally, even if no single utility bill is available, interval data may still be obtainable. For instance, in situations where no single overall utility bill for an entire building is available, such as when sub-metering is utilized, the MVNL technique may still be used to calculate energy and cost savings. Sub-metering may monitor the energy usage of certain portions of a building or individual pieces of equipment. The MVNL technique also may be utilized in situations where more frequent updating, such as daily, weekly, or bi-weekly, or more accurate monthly updating is either desired or required.

As noted above, the second mode of operation of the Energy and Cost Savings Calculation System may track energy and cost savings. The second mode may operate continuously and automatically. The second mode also may calculate ideal savings, actual savings, forecast savings, actual slip, and future slip of an environmental management system.

The second mode may utilize Baseline Extensions, Reference Period Modifications, actual analysis, and forecast analysis. The Baseline Extensions and Reference Period Modifications may provide energy usage and cost based upon consumption characteristics from another time period, i.e., use analysis of past data. The actual analysis may provide analysis of the actual energy usage and cost without adjustments. The actual analysis also may provide analysis based upon the most current or real-time data. The forecast analysis may provide analysis of anticipated or future energy usage and cost.

Figure 6:
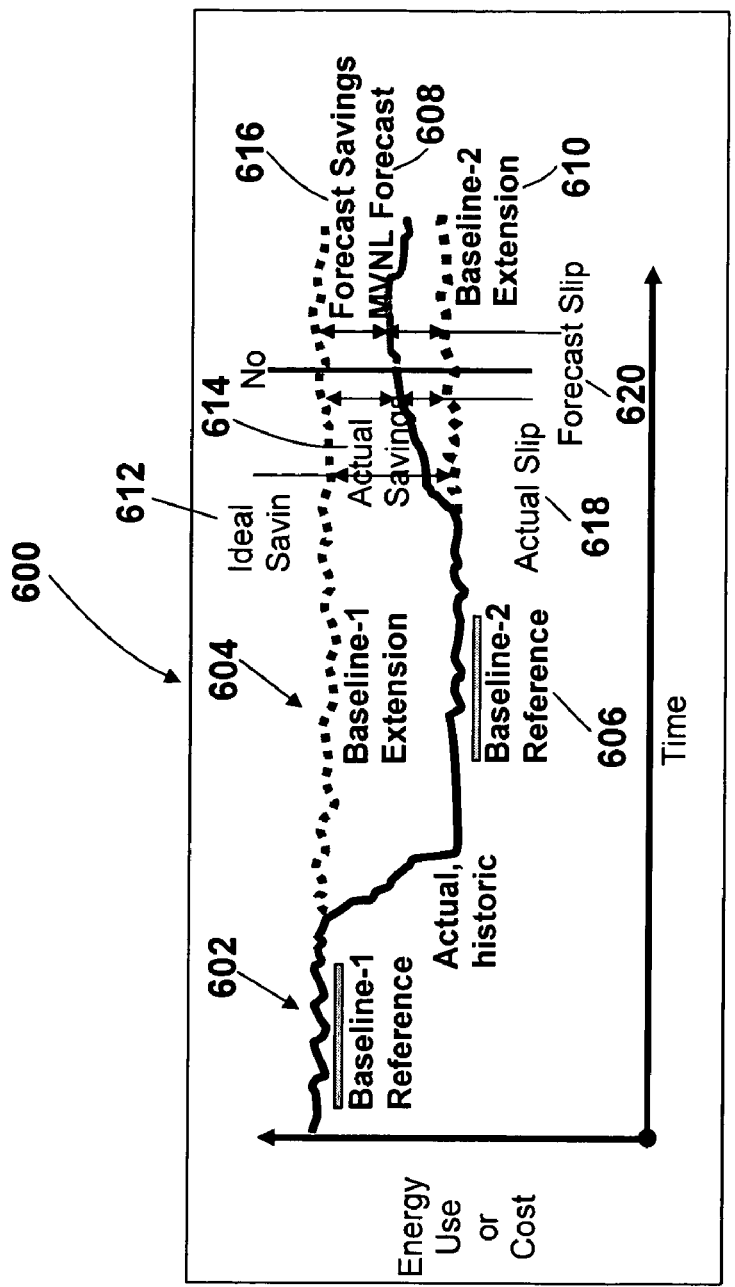
FIG. 6 illustrates a second mode of operation of the Energy and Cost Savings Calculation System.

FIG. 6 illustrates the second mode of operation 600 of the Energy and Cost Savings Calculation System. The second mode 600 may calculate or establish a first Baseline Reference 602 that estimates the energy usage prior to any retrofits or energy conservation measures being made to an environmental management system or building. The first Baseline Reference 602 may be extended to the present time period and beyond by a first Baseline Extension 604.

The second mode 600 also may calculate or establish a second Baseline Reference 606 that estimates the energy usage subsequent to retrofits or energy conservation measures being made to an environmental management system or building. The second Baseline Reference 606 may be extended, taking more recent or current conditions into consideration, to provide (1) an updated actual energy usage curve for the recent past and present, and (2) an anticipated or future energy use and cost curve, as shown by the MVNL Forecast curve 608. The second Baseline Reference 606 also may be extended to the present time period and beyond by a second Baseline Extension 610.

The Energy and Cost Savings Calculation System may calculate the Ideal Savings 612 by subtracting the second Baseline Extension 610 from the first Baseline Extension 604. The system may calculate the Actual Savings 614 by subtracting the actual energy usage from the first Baseline Extension 604. The Forecast Savings 616 may be calculated by subtracting the MVNL Forecast curve 608 from the first Baseline Extension 604.

The Slip is the amount of energy and cost savings expected but not actually realized. The Actual Slip 618 may be calculated by subtracting the second Baseline Extension 610 from the actual energy usage. The Forecast Slip 620 may be calculated by subtracting the second Baseline Extension 610 from the MVNL Forecast curve 608.

V. Exemplary Reports

FIG. 7 illustrates an exemplary weather and energy report. The report may provide energy usage and weather information. The report may be delivered as an email message or an email attachment. FIG. 7 shows the "Actual" and "Expected" entries within the "Weather and Energy Report." The Expected entry is based upon a MVNL load forecast of near-term historic data. The Expected entry may be used as a daily benchmark of the previous day's operation.

Load forecasting applications may prepare five-day forecasts of demand and consumption. For example, the MVNL load forecasting technique may be used to predict the peak electric and daily energy consumption for the next five days. The predictions may be based upon weather forecasts and operational schedules. FIG. 7 also shows an exemplary five-day weather and energy report.

Load forecasting applications may prepare weather-adjusted comparisons, including a comparison of the current year with the previous year. A comparison of the present year's energy usage with last year's usage may provide useful information. However, because various factors are not the same for different years, adjustments may be necessary. Accordingly, the MVNL load forecasting technique may be used to make weather and operational adjustments. Furthermore, another adjustment may be made to account for internal load changes. Additional, fewer, or alternate adjustments also may be performed.

FIG. 8 illustrates an exemplary comparative energy use report that displays weather-adjusted comparisons. As the monthly error rate of the MVNL technique may be quite low, the monthly entries in the report may have minimal distortion. Comparative energy use reports also may be used to track energy usage for ISO-14001 certification where continuous improvement is sought.

Figure 9:
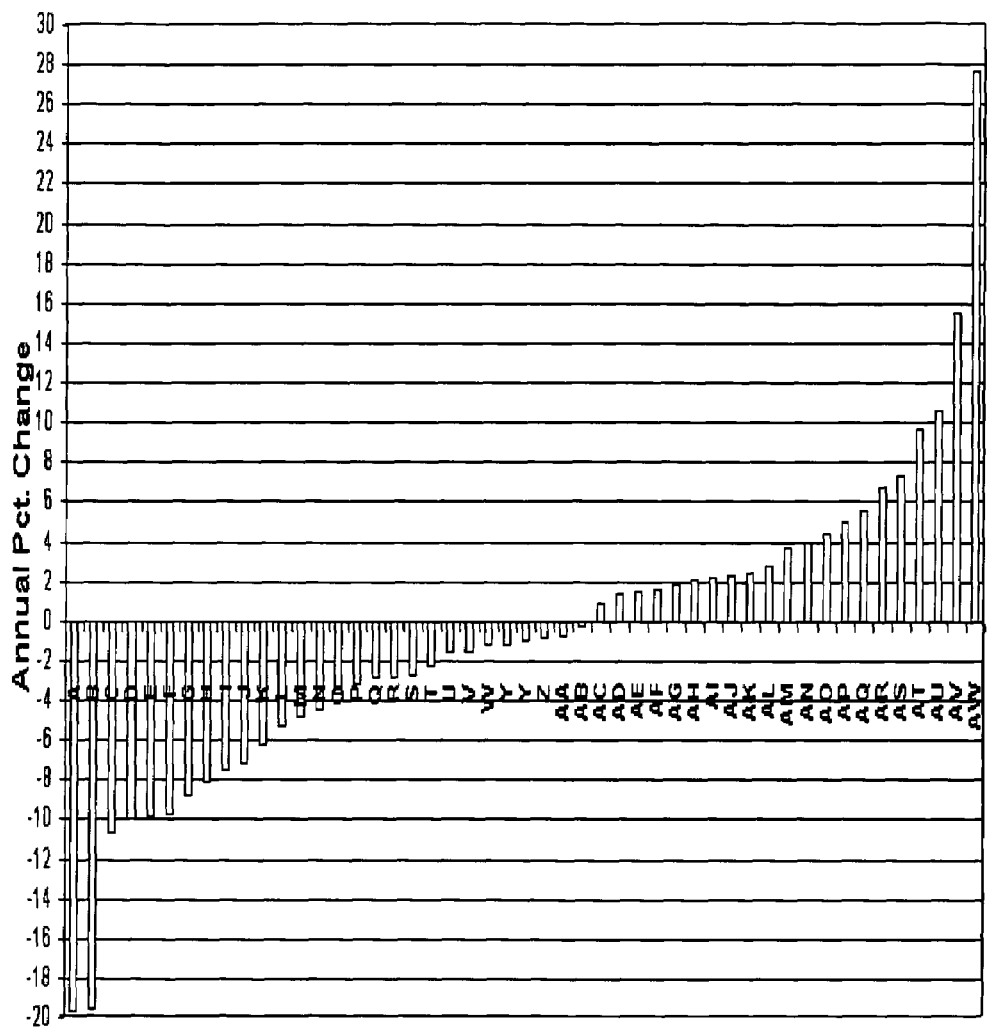
FIG. 9 illustrates weather-adjusted percentage change in annual electricity usage.
Figure 10A:
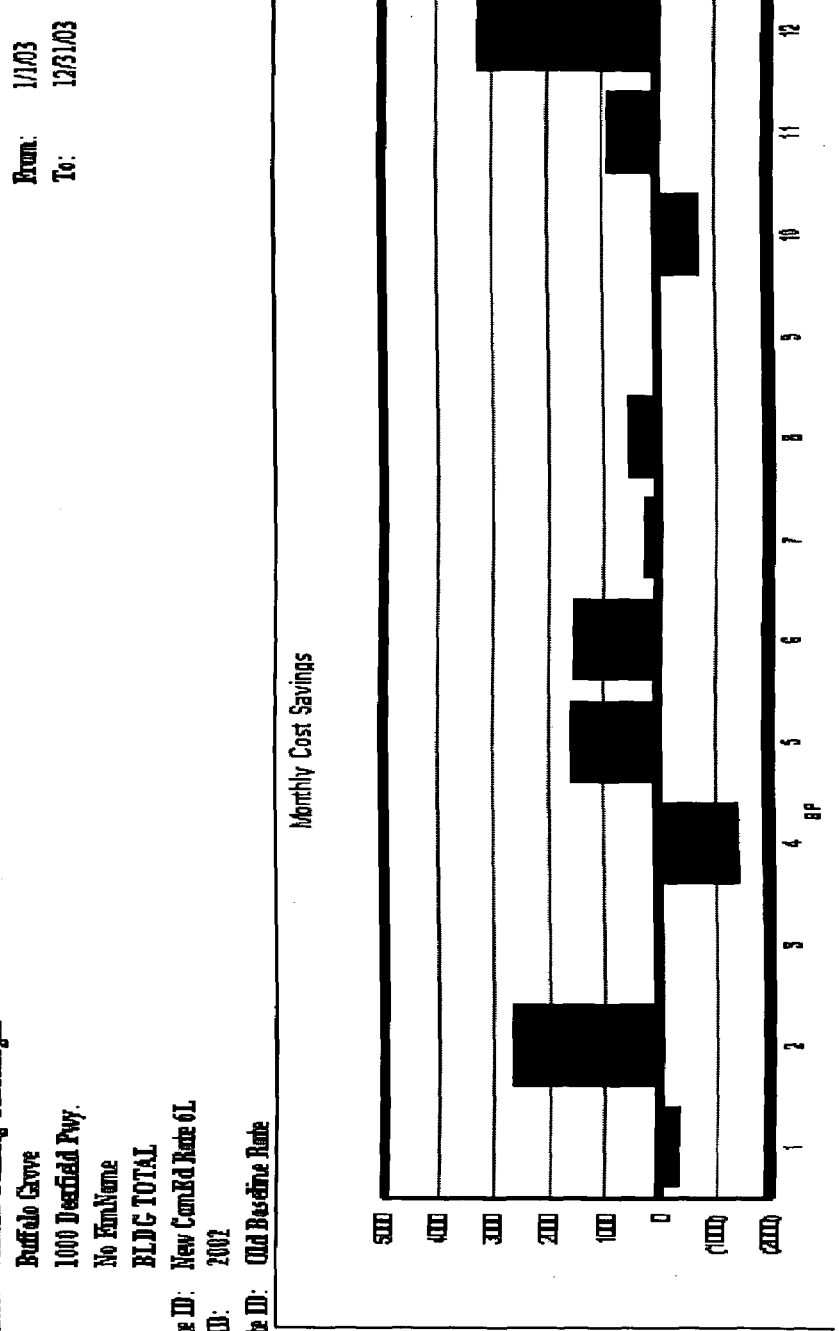

A weather-adjusted comparison may present an expected range of operational changes. The illustrative comparative energy use report discussed above was run for 49 facilities comparing the current year's power consumption against the previous year's weather-adjusted power consumption. The results are shown in FIG. 9, which illustrates weather-adjusted percentage change in annual electricity usage.

The percentage change of power used in the example shown ranges from −10% to +10%. FIG. 9 does show discontinuities at the extreme left (decrease) and the extreme right (increase). However, it should be noted that the two data entries at the far left represent faulty data due to monitoring difficulties as the meter was bypassed for several months during renovations. Additionally, the two entries at the far right represent faulty data due to more loads being added during the time period being monitored. On the other hand, the entries in the middle represent accurate data for a facility during the time period being monitored. As a result, one conclusion to be drawn is that operational changes, both positive and negative, may have a weather-adjusted net annual effect of between −10% to +10% in energy usage.

Load forecasting applications may compare energy usage to static, weather-adjusted Baselines and Basic Reference Periods. Many times, a static or fixed reference period is used for comparison. For example, a period before a major change is made may be used as the Baseline against which future energy consumption is to be measured. However, instead of being the previous year or time period before an energy conservation measure is employed, the Baseline may be a predefined static time period. The Comparative Energy Use Report shown in FIG. 8 also may be used as a reference.

Load forecasting applications may calculate the cost of wasteful operations. The same method that calculates savings can be used to calculate the cost of wasteful operations. FIGS. 10A through 10F illustrate a monitoring and verification (M&V) annual meter report. The M&V annual meter report shown also may be used to quantify excessive cost practices. The MVNL technique may be imbedded within the calculations. The small monthly error of the MVNL load forecasting technique means that wasteful operations may be accurately documented each month.

More specifically, FIGS. 10A through 10F illustrate the monthly cost savings over a twelve month period. For the example shown, an office building during one calendar year was compared to a weather-adjusted calendar year. The report shows a 1.3% reduction in power consumption with a 3.8% average increase in monthly peak loads. However, the on-peak electric rate for the Actual On-Going table was $0.05599/KWH, whereas the on-peak electric rate for the Baseline table was $0.06000/KWH. All other rate elements were the same. The resulting annual cost savings was over $8,000. If the rates were the same for the Baseline and the Actual On-Going tables, the results would have been a net annual increase in costs, i.e., waste, of approximately $4,400.

In sum, the Energy and Cost Savings Calculation System uses a MVNL load forecasting technique that is more accurate than the utility bill-based linear regression techniques. The MVNL technology enables monthly, weekly, and even daily load forecasting to be achieved with acceptable accuracy. The MVNL technique may utilize interval meter data that is automatically received by the system. The system may remove the limitation of monitoring only the main utility meter via monthly bills. Additionally, with the availability of MVNL using interval meter data, meters may be installed wherever they are needed. For example, if a chiller plant is retrofitted, a meter dedicated to the chiller plant may provide data for that specific conservation measure. As a result, the dilution of any energy and cost savings calculations by other parts of the facility, such as would be the case with utility bill-based monitoring of the main electric meter, may be prevented.

VI. Weather Data Quality Control and Ranking Method

The Energy and Cost Calculation System employs a Weather Data Quality Control and Ranking Method. The Weather Data Quality Control and Ranking Method collects, manages, and updates weather histories and/or forecasts. The Weather Data Quality Control and Ranking Method may identify and describe the design specification of a software program that automatically collects weather histories and/or forecasts and updates a weather database. The weather histories and/or forecasts may used with different systems.

Weather data obtained from weather data providers, such as the National Weather Service (NWS), may not always be accurate. The Weather Data Quality Control and Ranking Method identifies errors and subsequently provides reasonable data to overcome inaccuracies. To provide reasonable weather data, the method may subject the weather data to a quality control procedure. If weather data is received from more than one weather data provider, the method may rank the weather data providers based upon the accuracy of the data each provided.

VII. Quality Control Procedure

The quality control procedure may accept weather readings and then perform (1) hourly data quality control checks, (2) daily summary quality control checks, and (3) forecast quality control checks. Additional, fewer, or alternate quality control checks may be performed by the quality control procedure.

A. Readings

The quality control procedure collects data pertaining to a number of weather readings. At the end of each day, the following data may be collected for each weather city: (1) daily summary information, (2) hourly spot readings for the day, and (3) thirty-year monthly averages. Table IV below illustrates exemplary weather readings collected by the quality control procedure. Additional, fewer, or alternate weather parameters may be collected on a daily basis.

TABLE IV

Exemplary Weather Readings

| | |
|---|---|
| Daily summary information | Daily high, low, and mean dry bulb temperatures |
| | Barometric pressure |
| | Daily dew point temperature |
| | Wind speed |
| | Precipitation |
| | Average daily high and low dry bulb temperatures |
| | Record high and low dry bulb temperatures |
| Hourly spot readings | Dry bulb temperature |
| | Dew point temperature |
| | Barometric Pressure |
| | Solar condition |
| | Wind speed |
| | Precipitation |
| Thirty-year monthly averages | Average daily high temperature |
| | Average daily low temperature |

As shown in Table IV, the exemplary daily summary information includes (1) the daily high, low, and mean dry bulb temperatures, (2) the daily dew point temperature, (3) barometric pressure, (4) wind speed, (5) precipitation, (6) the average daily high and low dry bulb temperatures, and (7) the record high and low dry bulb temperatures. The exemplary hourly spot readings for the day include (1) the dry bulb temperature, (2) the dew point temperature, (3) barometric pressure, and (4) the solar condition, i.e., sunny, clear, partly cloudy, cloudy, overcast, rain, etc. The exemplary thirty-year monthly averages include (1) the average daily high temperature and (2) the average daily low temperature. The daily summary information, the hourly spot readings, and the thirty-year monthly average may include additional, fewer, or alternate weather parameters.

Table V below illustrates alternative exemplary daily summary information. The daily summary information of Table V includes temperature, moisture, precipitation, pressure, wind, and visibility data. The temperature data includes mean, maximum, and minimum temperatures, as well as degree day information. The moisture data includes dew point, average, maximum, and minimum humidity information. The wind data includes wind speed, maximum wind speed, and maximum gust speed data. Table V, as well as Tables VI, XII, XIII, and XIV below, contains information received from the Weather Underground, a provider of weather information. Alternative weather data and information providers also may be used.

TABLE V

Exemplary Daily Summary Information

|  | Actual | Average | Record |
|---|---|---|---|
| Temperature | | | |
| Mean Temperature | 68° F./20° C. | — | |
| Max Temperature | 97° F./36° C. | 92° F./33° C. | 100° F./37° C. (1930) |
| Min Temperature | 39° F./3° C. | 53° F./11° C. | 43° F./6° C. (1932) |
| Cooling Degree Days | 3 | | |
| Growing Degree Days | 18 (Base 50) | | |
| Moisture | | | |
| Dew Point | 40° F./4° C. | | |
| Average Humidity | 27 | | |
| Maximum Humidity | 95 | | |
| Minimum Humidity | 13 | | |
| Precipitation | | | |
| Precipitation | 0.00 in/0.00 cm | — | –0 |
| Pressure | | | |
| Sea Level Pressure | 30.01 in/1016 hPa | | |
| Wind | | | |
| Wind Speed | 7 mph/11 km/h (NW) | | |
| Max Wind Speed | 16 mph/26 km/h | | |
| Max Gust Speed | 17 mph/27 km/h | | |
| Visibility | 9 miles/14 kilometers | | |
| Events | | | |

Additionally, Table VI below illustrates alternative exemplary hourly weather information. The hourly weather information of includes time, temperature, dew point, humidity, pressure, visibility, wind direction, wind speed, gust speed, precipitation, event, and solar conditions data. The hourly weather information may include additional, fewer, or alternate weather parameters.

The quality control procedure also may collect the data for each weather city at the end of each hour related to the present time and various forecast information. The present time data may include the dry bulb temperature, the dew point temperature, and Condition data. The forecast information includes data pertaining to various forecasts, such as a one-day forecast, a five-day forecast, a nine-day forecast, or other forecasts. The forecast data may include the high temperature for the day, the low temperature for the day, and Condition data. If there are multiple hourly readings of the dry-bulb temperature, the dew point temperature, and condition data for a weather city, the data may be merged or averaged, such that duplicate data points are discarded.

TABLE VI

Exemplary Hourly Weather Information

| Time (PDT) | Temperature | Dew Point | Humidity | Pressure | Visibility | Wind Direction | Wind Speed | Gust Speed | Precipitation | Events | Conditions |
|---|---|---|---|---|---|---|---|---|---|---|---|
| 4:56 AM | 60.1° F./15.6° C. | 37.0° F./2.8° C. | 42% | 29.94 in/1013.8 hPa | 10.0 miles/16.1 kilometers | SSE | 3.5 mph/5.6 km/h | — | N/A | | Partly Cloudy |
| 5:56 AM | 60.1° F./15.6° C. | 37.9° F./3.3° C. | 44% | 29.96 in/1014.4 hPa | 10.0 miles/16.1 kilometers | South | 6.9 mph/11.1 km/h | — | N/A | | Partly Cloudy |
| 6:56 AM | 66.0° F./18.9° C. | 39.9° F./4.4° C. | 38% | 29.99 in/1015.6 hPa | 10.0 miles/16.1 kilometers | SSW | 4.6 mph/7.4 km/h | — | N/A | | Clear |
| 7:56 AM | 73.0° F./22.8° C. | 43.0° F./6.1° C. | 34% | 30.08 in/1018.5 hPa | 10.0 miles/16.1 kilometers | WSW | 3.5 mph/5.6 km/h | — | N/A | | Smoke |
| 8:56 AM | 79.0° F./26.1° C. | 43.0° F./6.1° C. | 28% | 30.09 in/1018.8 hPa | 10.0 miles/16.1 kilometers | | 5.8 mph/9.3 km/h | — | N/A | | Smoke |
| 9:56 AM | 82.0° F./27.8° C. | 41.0° F./5.0° C. | 23% | 30.09 in/1018.8 hPa | 10.0 miles/16.1 kilometers | | 6.9 mph/11.1 km/h | — | N/A | | Partly Cloudy |
| 10:56 AM | 86.0° F./30.0° C. | 39.0° F./3.9° C. | 19% | 30.09 in/1018.8 hPa | 10.0 miles/16.1 kilometers | | 6.9 mph/11.1 km/h | — | N/A | | Partly Cloudy |
| 11:56 AM | 89.1° F./31.7° C. | 37.0° F./2.8° C. | 16% | 30.07 in/1018.2 hPa | 10.0 miles/16.1 kilometers | North | 8.1 mph/13.0 km/h | — | N/A | | Partly Cloudy |
| 12:56 PM | 90.0° F./32.2° C. | 36.0° F./2.2° C. | 15% | 30.05 in/1017.5 hPa | 10.0 miles/16.1 kilometers | | 3.5 mph/5.6 km/h | — | N/A | | Scattered Clouds |
| 1:56 PM | 91.9° F./33.3° C. | 37.9° F./3.3° C. | 15% | 30.03 in/1016.8 hPa | 10.0 miles/16.1 kilometers | NNW | 6.9 mph/11.1 km/h | — | N/A | | Scattered Clouds |
| 2:56 PM | 39.2° F./4.0° C. | 37.9° F./3.3° C. | 95% | 30.01 in/1016.1 hPa | 6.0 miles/9.7 kilometers | North | — | — | N/A | | Scattered Clouds |
| 3:56 | 97.0° F./ | 39.0° F./ | 13% | 29.99 in/ | 6.0 miles/ | North | 11.5 mph/ | 17.3 mph/ | N/A | | Scattered |

TABLE VI-continued

Exemplary Hourly Weather Information

| Time (PDT) | Temperature | Dew Point | Humidity | Pressure | Visibility | Wind Direction | Wind Speed | Gust Speed | Precipitation | Events | Conditions |
|---|---|---|---|---|---|---|---|---|---|---|---|
| PM 4:56 | 36.1° C. 97.0° F./ 36.1° C. | 3.9° C. 37.9° F./ | 13% | 1015.5 hPa 29.88 in/ 1011.8 hPa | 9.7 kilometers 6.0 miles/ 9.7 kilometers | North | 18.5 km/h 6.9 mph/ 11.1 km/h | 27.8 km/h — | N/A | | Clouds Scattered Clouds |
| PM 5:56 | | 3.3° C. | N/A % | 29.95 in/ | 6.0 miles/ | North | 9.2 mph/ | | N/A | | Scattered |

B. Hourly Data Quality Control Checks

The quality control procedure may employ hourly data quality control checks performed upon hourly weather data. Table VII below illustrates exemplary hourly data quality control checks. The hourly data quality control checks may include (1) temperature-only pattern checks, (2) time checks between hourly entries, (3) checks for each dew point/dry bulb temperature pair, (4) checks for temperature deviation from average temperature, (5) checks for temperature slope, (6) finding the provisional daily high and low temperatures, and (7) comparison of the provisional high and low temperatures with historical data. Additional, fewer, or alternate hourly data quality control checks may be performed by the quality control procedure.

TABLE VII

Exemplary Hourly Quality Control Checks

| Hourly data quality control checks | Temperature-only pattern checks<br>Time checks between hourly entries<br>Dew point/dry bulb temperature pair checks<br>Temperature deviation from average checks<br>Temperature slope checks<br>Provisional daily high and low temperatures determinations<br>Provisional temperatures versus historical data checks |
|---|---|

The hourly data quality control checks may include temperature-only pattern checks. Data entries received may include temperature-only data and complete data. The temperature-only data entries include only limited data, the limited data including temperature data. On the other hand, the "complete" data entries include more weather parameters, such as dry bulb temperature, dew point temperature, relative humidity, and pressure information. The complete data entries may include additional, fewer, or alternate weather parameters. The temperature-only pattern checks may identify extra data entries that originate from a second temperature sensor and provide only limited data. The presence of a second temperature sensor may distort the weather data received. This is an example of a data processing error by the weather provider that is illustrated by Table XII below. Therefore, in such a situation, weather data entries with temperature-only information may be considered to be inaccurate and not accepted as reasonable data.

In one embodiment, the quality control procedure may identify when a temperature-only pattern occurs a certain number of times, such that the temperature-only entries account for a specific percentage of all of the data entries. For example, if the quality control procedure determines that the temperature-only entries account for 40% or more of all of the data entries, the quality control procedure may check for the following patterns:

| Beginning: | <Temperature-only> <Complete Data> ....... |
| Middle: | <Complete Data> <Temperature-only> <Complete Data> |
| End: | ....... <Complete Data> <Temperature-only> |

The quality control procedure may remove any temperature-only entries which fit the above data patterns. Additional, fewer, or alternate data patterns also may be used by the quality control procedure to identify temperature-only patterns or other patterns likely having problematic or erroneous data.

The hourly data quality control checks may include time checks between hourly data entries. The next data entry received may be accepted as reasonable data if the next data entry was recorded after the previous data entry, i.e., the next data entry has a time field that is later in time than a time field of the previous data entry. Additionally, the previous or last data entry recorded may be kept as the current data entry if the next data entry was recorded at the same time or within a threshold time as the previous data entry. On the other hand, if the next data entry was recorded before the previous data entry, the next data entry may be accepted and every data entry having a later recorded time than the next data entry may be assumed to be erroneous data and discarded.

The dew point temperature is a measure of the moisture content of the air. The dew point is the temperature at which air becomes saturated with water vapor if it is cooled without any addition or removal of water vapour. When air is cooled to its dew point temperature, the water vapour contained begins to condense into visible water droplets. On the other hand, the dry bulb temperature is a measure of the amount of heat in the air. The dry bulb temperature is the temperature that is indicated by a standard thermometer when properly ventilated and shielded from the direct rays of the sun. The dew point temperature is always equal to (if the air is saturated) or lower than the dry bulb temperature. The greater the spread between the dry bulb and the dew point, the drier the air is.

Accordingly, the hourly data quality control checks may include checking each dew point/dry bulb temperature pair within a data entry. As noted above, the dew point temperature should be equal to or less than dry bulb temperature. Thus, if the comparison of the dew point temperature with the dry bulb temperature for a data entry reveals that the dew point temperature is greater than the dry bulb temperature, the entire data entry may be assumed to be erroneous data and deleted from the database.

The hourly data quality control checks may include checking temperature deviations away from the average temperature. The temperature deviation check may analyze all of the available hourly spot readings. For each temperature reading, an average temperature may be calculated using all of the available temperature readings except the temperature reading in question. The temperature reading in question should be within a given range from the average temperature. If the temperature reading in question is outside of a window or a range from the average temperature, that reading may be discarded. Subsequently, the temperature deviation check may move to the next temperature reading and again check for a temperature that deviates away from the average temperature by more than a given range. In one embodiment, the window that the temperature reading in question should be within to be acceptable is a plus or minus thirty degree Fahrenheit range from the average temperature. Larger or smaller temperature deviation windows away from the average temperature also may be used.

The hourly data quality control checks may include temperature slope checks. The temperature slope checks may involve calculating temperature differences and time differences between all of the temperature readings. The temperature slope checks may use an allowable time/temperature difference table to determine if each derivative of time as a function of temperature (e.g., 'delta-Time/delta-Temperature') determination is within an allowable range or window. If the delta-Time/delta-Temperature determination is within the allowable range the data entry is acceptable, otherwise the temperature reading is unacceptable.

For example, for the first temperature reading, if the trailing delta-Time/delta-Temperature determination is unacceptable, that temperature reading may be deleted. For the last temperature reading, if the leading delta-Time/delta-Temperature determination is unacceptable, that temperature reading may be deleted. For all other or intermediate readings, if the leading and trailing delta-Time/delta-Temperature determinations are unacceptable, and/or if the slopes have opposite signs, i.e., one is positive and one is negative, that reading may be deleted. TABLE VIII below illustrates an exemplary allowable delta-Time/delta-Temperature difference table.

TABLE VIII

Exemplary Allowable delta-Time/delta-Temperature

| Time Difference | Maximum Temperature Difference | Action |
|---|---|---|
| Less than or equal to 30 minutes | Greater than 20 degree F. | If the test fails, delete the second value; delete the entire entry for that time from consideration. |
| Less than or equal to 60 minutes | Greater than 27 degree F. | If the test fails, delete the second value; delete the entire entry for that time from consideration. |
| Less than or equal to 120 minutes | Greater than 35 degree F. | If the test fails, delete the second value; delete the entire entry for that time from consideration. |
| Greater than 120 minutes | | Pass. |

The hourly data quality control checks may include determining provisional high and low temperatures for the day. The quality control checks may include comparing the provisional high and low temperatures to (1) a daily average high and low temperature range, (2) a daily record high and low temperature range, (3) a thirty-year average monthly high and low temperature range, and (4) an all-time high and low temperature range, respectively. Additional, fewer, or alternate types of temperature ranges may be used for comparison with the provisional high and low temperatures.

The hourly data quality control checks may include a comparison of the provisional daily high and low temperature to the daily average high and low temperature, respectively. The provisional daily high temperature may be compared with a range or window centered about the daily average high temperature. Likewise, the provisional daily low temperature may be compared with a range or window centered about the daily average low temperature. Both the provisional daily high and low temperatures must be within the corresponding range to be acceptable. In one embodiment, the provisional daily high temperature may be compared with a plus and minus 30 degrees Fahrenheit range centered about the daily average high temperature and the provisional daily low temperature may be compared with a plus and minus 30 degree Fahrenheit range centered about the daily average low temperature. Other temperature ranges centered about the daily average high and low temperatures also may be used.

The hourly data quality control checks may include a comparison of the provisional daily high and low temperature to the daily record high and low temperature, respectively. The provisional daily high temperature may be compared with a range or window centered about the daily record high temperature. Likewise, the provisional daily low temperature may be compared with a range or window centered about the daily record low temperature. Both the provisional daily high and low temperatures must be within the corresponding range to be acceptable. In one embodiment, the provisional daily high temperature may be compared with a plus and minus 3 degrees Fahrenheit window centered about the daily record high temperature and the provisional daily low temperature may be compared with a plus and minus 3 degrees Fahrenheit window centered about the daily record low temperature. Other temperature ranges centered about the daily record high and low temperatures also may be used.

The hourly data quality control checks may include a comparison of the provisional daily high and low temperature to the thirty-year average monthly high and low temperature, respectively. The provisional daily high temperature may be compared with a range or window centered about the thirty-year average monthly high temperature. Similarly, the provisional daily low temperature may be compared with a range or window centered about the thirty-year average monthly low temperature. Both the provisional daily high and low temperatures should be within the corresponding range to be acceptable. In one embodiment, the provisional daily high temperature may be compared with a plus and minus 30 degrees Fahrenheit range centered about the thirty-year average monthly high temperature and the provisional daily low temperature may be compared with a plus and minus 30 degree Fahrenheit range centered about the thirty-year average monthly low temperature. Other temperature ranges centered about the thirty-year monthly high and low temperatures also may be used.

The hourly data quality control checks may include a comparison of the provisional daily high and low temperatures to the all-time high and low temperatures, respectively. Both the provisional daily high and low temperature should be within a range having the all-time high temperature and the all-time low temperature as boundaries. The provisional daily high temperature should be less than the all-time high temperature to be acceptable. The provisional daily low temperature should be greater than the all-time low temperature to be acceptable. In one embodiment, the provisional daily high temperature may be compared with a default all-time high temperature of 130 degrees Fahrenheit and the provisional daily low temperature may be compared with a default all-time low temperature of minus 60 degrees Fahrenheit. Other default all-time high and low temperatures also may be used.

If the provisional high and low temperatures fail one or more of the checks listed directly above, i.e., the provisional temperatures are outside of the corresponding windows or ranges, the data may not be accepted or discarded as inaccurate. Alternatively, the provisional high and low temperatures may be acceptable if they fall within one or more of the comparison windows discussed directly above. In one embodiment, to be acceptable, the provisional daily high and low temperatures both must fall within the all-time high and low temperature range and at least one of either the average daily high and low temperature range, the record high and low temperature range, or the thirty-year average monthly high and low temperature range, respectively. Hence, the provisional daily high and low temperatures are not acceptable if either falls outside of the average daily high and low temperature range, the record high and low temperature range, or the thirty-year average monthly high and low temperature range, respectively. Additional, fewer, or alternate comparison windows or combinations of comparisons also may be used.

C. Daily Summary Quality Control Checks

The quality control procedure may employ daily summary quality control checks performed upon daily weather data. Table IX below illustrates exemplary daily summary control checks. The exemplary daily summary quality control checks shown include a high/low temperature check, a high/low temperature slope check, and comparisons involving provisional high and low temperatures. Additional, fewer, or alternate daily summary quality control checks may be performed.

TABLE IX

Exemplary Daily Summary Quality Control Checks

| | |
|---|---|
| Daily summary quality control checks | High and low temperature check |
| | High and low temperature slope check |
| | Provisional high and low temperature check |

The daily summary quality control checks may include a high/low temperature check. The high/low temperature check may be a reasonableness test of the daily weather data. The high/low temperature check compares the high temperature for the day with the low temperature for the day. The high temperature for the day must not be less than the low temperature for the day for the data to be acceptable.

The daily summary quality control checks may include a high/low temperature slope check. The high/low temperature slope check may include checking if the hourly temperature slope check, mentioned above during the discussion of the hourly data quality control checks, resulted in a temperature reading being discarded. If so, the daily high and low temperatures may be checked for the value of the temperature reading discarded. Upon a match being identified, the daily high or low temperature may be replaced by either a default or estimated value.

The daily summary quality control checks may include determining provisional high and low temperatures for the day. Similar to the hourly quality control checks, the daily summary quality control checks may include comparing the provisional high and low temperatures to (1) a daily average high and low temperature range, (2) a daily record high and low temperature range, (3) a thirty-year average monthly high and low temperature range, and (4) an all-time high and low temperature range, respectively. Additional, fewer, or alternate types of temperature ranges may be used for comparison with the daily provisional high and low temperatures.

The daily summary quality control checks may include a comparison of the provisional daily high and low temperature with a range or window centered about the daily average high and low temperature, respectively. Both the provisional daily high and low temperatures must be within the corresponding range to be acceptable. In one embodiment, the provisional daily high and low temperature may be compared with a plus and minus 40 degrees Fahrenheit range centered about the daily average high and low temperature, respectively. Other temperature ranges centered about the daily average high and low temperatures also may be used.

The daily summary quality control checks may include a comparison of the provisional daily high and low temperature with a range or window centered about the daily record high and low temperature, respectively. Both the provisional daily high and low temperatures must be within the corresponding range to be acceptable. In one embodiment, the provisional daily high and low temperature may be compared with a plus and minus 3 degrees Fahrenheit window centered about the daily record high and low temperature, respectively. Other temperature ranges centered about the daily record high and low temperatures also may be used.

The daily summary quality control checks may include a comparison of the provisional daily high and low temperature with a range or window centered about the thirty-year average monthly high and low temperature, respectively. Both the provisional daily high and low temperatures should be within the corresponding range to be acceptable. In one embodiment, the provisional daily high and low temperature may be compared with a plus and minus 30 degrees Fahrenheit range centered about the thirty-year average monthly high and low temperature, respectively. Other temperature ranges centered about the thirty-year monthly high and low temperatures also may be used.

The daily summary quality control checks may include a comparison of the provisional daily high and low temperatures to the all-time high and low temperatures. Both the provisional daily high and low temperature should be within a range having the all-time high temperature and the all-time low temperature as boundaries. In one embodiment, the provisional daily high and low temperatures may be compared with a default all-time high and low temperature range of between plus 130 to minus 60 degrees Fahrenheit. Other default all-time high and low temperatures also may be used.

The provisional high and low temperatures may be discarded if the provisional high or low temperature fails one or more of the above daily summary quality control comparisons. Alternatively, the provisional high and low temperatures may be acceptable if they fall within one or more of the comparison windows directly above. For example, in one embodiment, the high temperature for the day must not be less than the low temperature for the day and the provisional daily summary high and low temperature data must fall within the all-time high and low temperature window to be acceptable. In another embodiment, the daily summary data is discarded if the provisional daily summary high and low data falls outside either the average high and low window, the record high and low window, or the thirty-year average monthly high and low window, respectively.

The daily summary quality control checks may further include checking the daily dew point temperature. The dew point temperature should be equal to or less than the maximum dry bulb temperature. If maximum dew point temperature is greater than the dry bulb temperature, the daily dew point temperature entry should be discarded.

Additionally, if the dew point temperature is inaccurate, the system may calculate a time-weighted average dew point temperature from the hourly spot reading data. Subsequently, the time-weighted average dew point temperature may be tested against the dry bulb temperature. If the time-weighted average dew point temperature is equal to or less than the maximum dry bulb temperature, the time-weighted average dew point temperature may be accepted as an approximate dew point temperature. Other approximate dew point temperatures also may be used.

D. Forecast Quality Control Checks

The quality control procedure may employ forecast quality control checks performed upon forecast weather data. The forecast quality control checks may be performed upon data corresponding to weather forecasts of various timeframes, such as one-day, two-day, three-day, four-day, five-day, six-day, seven-day, eight-day, nine-day, and other longer term forecasts. Table X illustrates exemplary forecast quality control checks. The exemplary forecast quality control checks shown include a high/low temperature check. The forecast quality control checks may include determining provisional forecast daily high and low temperatures. The forecast quality control checks may include comparing the provisional forecast daily high and low temperature to (1) a daily average high and low temperature range, (2) a daily record high and low temperature range, (3) a thirty-year average monthly high and low temperature range, and (4) an all-time high and low temperature range, respectively. Additional, fewer, or alternate types of temperature ranges may be used for comparison with the daily forecast provisional high and low temperatures.

TABLE X

Exemplary Forecast Quality Control Checks

| Forecast quality control checks | High and low temperature check Provisional forecast daily high and low temperature compared with: (1) Average high and low window (2) Record high and low window (3) Thirty-year average monthly high and low window (4) All-time high and low window |
|---|---|

The daily summary quality control checks may include a high/low temperature check. The high/low temperature check may be a reasonableness test of the forecast weather data. The high/low temperature check compares the forecast high temperature for the day with the forecast low temperature for the day. The forecast high temperature for the day must not be less than the forecast low temperature for the day for the data to be acceptable.

The forecast quality control checks may include a comparison of the provisional forecast daily high and low temperature with a range or window centered about the daily average high and low temperature, respectively. Both the provisional daily high and low temperatures must be within the corresponding range to be acceptable. In one embodiment, the provisional daily high and low temperature may be compared with a plus and minus 30 degrees Fahrenheit range centered about the daily average high and low temperature, respectively. Other temperature ranges centered about the daily average high and low temperatures also may be used.

The forecast quality control checks may include a comparison of the provisional forecast daily high and low temperature with a range or window centered about the daily record high and low temperature, respectively. Both the provisional forecast daily high and low temperatures must be within the corresponding range to be acceptable. In one embodiment, the provisional forecast daily high and low temperature may be compared with a plus and minus 3 degrees Fahrenheit window centered about the daily record high and low temperature, respectively. Other temperature ranges centered about the daily record high and low temperatures also may be used.

The forecast quality control checks may include a comparison of the provisional forecast daily high and low temperature with a range or window centered about the thirty-year average monthly high and low temperatures, respectively. Both the provisional forecast daily high and low temperatures should be within the corresponding range to be acceptable. In one embodiment, the provisional forecast daily high and low temperature may be compared with a plus and minus 30 degrees Fahrenheit range centered about the thirty-year average monthly high and low temperature, respectively. Other temperature ranges centered about the thirty-year monthly high and low temperatures also may be used.

The forecast quality control checks may include a comparison of the provisional forecast daily high and low temperatures to the all-time high and low temperatures. Both the provisional forecast daily high and low temperature should be within a range having the all-time high temperature and the all-time low temperature as boundaries. In one embodiment, the provisional forecast daily high and low temperatures may be compared with a default all-time high and low temperature range of between plus 130 to minus 60 degrees Fahrenheit. Other default all-time high and low temperatures also may be used.

If the provisional forecast daily high and low temperatures fail one or more of the comparisons directly above the forecast weather data may be discarded as inaccurate. Alternatively, the provisional forecast daily high and low temperatures may be acceptable if both pass one or more of the above comparisons. Additional, fewer, or alternate comparisons may be used to identify inaccuracies in the forecast weather data.

In one embodiment, the provisional forecast daily high and low temperature data must fall within the all-time high and low temperature range and either the average high and low temperature range, the record high and low temperature range, or the thirty-year average monthly high and low temperature range to be acceptable. If either the provisional forecast daily high and low temperature data falls outside of the average high and low temperature range, the record high and low temperature range, or the thirty-year average monthly high and low temperature range the forecast data is deemed inaccurate and not acceptable. However, alternate rules, including additional, fewer, or different tests, also may be used.

VIII. Ranking to Find the Best Daily Temperature Set

The weather ranking program may accept weather data from one or more sources. The data may be provided in a daily summary or other summary. The weather data is typically available for a given location on a daily basis. Each weather data source may be ranked in order of perceived accuracy, such as illustrated in Table XI below. The Energy and Cost Savings Calculation System may select and utilize the daily summary or other summary from the weather data source having the lowest ranking number. The summary of weather data that drives the Multi-Variant Non-Linear technique discussed herein may be derived from daily summaries, hourly summaries, a 3, 5, or 9 day old forecast, nearby city data, 30 year averages, other weather data previously discussed, or alternative weather data summaries.

Weather Ranking may facilitate more accurate energy and cost savings calculations. Weather data is needed every day to calculate energy and cost savings on a daily basis. However, weather data supplied from data providers may become unavailable for numerous reasons. For instance, the most current weather data may not always be automatically retrievable from a weather data provider due to service interruption, computer, network, or other equipment failure, computer glitches, power outages, garbled data, or other technical difficulties.

On the other hand, the weather ranking program always provides weather data for energy and cost savings calculations. If technical difficulties arise that prevent receiving weather for a specific location on a given day from a weather data provider, the weather ranking program provides reasonable or expected weather data. For example, if up-to-date weather data from one data provider becomes unavailable, the weather ranking program may use the hourly, daily, or forecast quality control checks discussed above to determine the most accurate weather data available. The weather ranking program also may use forecast weather data, a nearby city's weather data, a 30 year average data, or other weather data to approximate the past, current, and future weather data. The approximate past, current, and future weather data may then be used to perform energy and cost saving calculations.

If the up-to-date weather data remains unavailable for a given period of time, the Weather Data Quality Control and Ranking Method may continuously determine the data sets likely to most accurately reflect the actual weather and rank the data sets accordingly. The weather ranking module may use the quality control checks discussed herein to rank the data sets by perceived accuracy. Additional methods for ranking the available data also may be used. For example, temperature data regarding a nearby city may be deemed to be more accurate than a thirty year average. In other cases, a three-day or other length forecast may be determined to be the most accurate weather data available.

The method also may provide for automatic, continuous improvement of the ranking of the weather data. For example, the method may automatically replace a 5 day forecast rank by a 4 day forecast the next day, if up-to-date data is unavailable. Also, there may be multi-day delays in current daily summary weather becoming available. In such a case, it may be a week or more before a "1 day forecast" rank is improved to a "daily summary" rank (the 1 day forecast rank may be the most accurate data if the up-to-date daily summary information is unavailable).

The method may provide a weather data continuum of past, present, and future data to enhance the reliability of energy and cost savings calculations. The nature of the weather data allows the Weather Data Quality Control and Ranking Method to build a continuum of weather data from the distant past to the distant future. The past, current, and future weather data may be stored in the same way and at the same location, such as in a data table or other data structure. Hence, forecast weather data may be handled the same way as other weather data, such as daily summaries, current, past, historic, and average weather data.

The weather data may be updated periodically, such as daily. However, as time passes, a portion of the future data becomes past data. For example, the 30-year average high and low temperature may become the forecast high and low temperature or the forecast high and low temperature may become the historic summary high and low temperature. Thus, the Weather Data Quality Control and Ranking Method may not recognize a distinct boundary between past, current, and future weather data. This facilitates the extension of Baselines into the future in calculating energy and cost savings.

The method may use quality control checks to identify and eliminate erroneous data. Subsequently, the ranking module may make a selection of the most accurate high and low temperature for the day. The method may start at the top of a list of weather data sets during the ranking determination procedure. The first data set which passes the quality control checks is initially ranked number 1. Alternative determinations of ranking also may be used.

More specifically, the Weather Data Quality Control and Ranking Method tests the accuracy of weather data received from weather data providers. If weather data is received from more than one weather data provider, the method may rank the data received according to accuracy and assign corresponding rank numbers. Alternatively, the method may rank the accuracy of data sets received from a single weather data provider. In one embodiment, the most accurate weather will be assigned the smallest rank number. Subsequently, the Energy and Cost Calculation System may use the daily high and low temperatures from the available weather data which is ranked to be the most accurate to calculate energy and cost savings resulting from energy conservation measures.

During testing, it was observed that the daily weather summary high and low temperatures did not always agree with the high and low temperatures in the hourly 'spot' readings. In many instances, high and low temperatures are entered by hand or comprise a manual edit of an obviously erroneous data field prior to distribution. This is especially noticeable in cities having hourly readings that covered only a portion of the day which do not reflect typical daily temperature extremes. The ranking procedure may identify these types of data entries.

The ranking procedure may include two categories of testing for daily high and low temperatures: (1) Abbreviated Rank Testing and (2) Full Rank Testing. Weather data providers may provide different amounts of weather data. For example, weather data may correspond to different weather parameters or to different cities from one weather data provider to the next. Therefore, abbreviated or more thorough testing of the data supplied by a specific source may depend upon the amount and type of weather data supplied. Abbreviated Rank Testing is also performed on certain locations for which there is not a need for Full Rank Testing.

Table XI below illustrates the results of an exemplary ranking procedure. The exemplary ranking procedure for Full Rank Testing and Abbreviated Rank Testing. The "full rank" designated cities underwent full testing. On the other hand, due to the large number of "abbreviated" cities for which weather data is supplied, those cities underwent an abbreviated testing sequence. The ranking order is as shown in Table XI.

Table XI illustrates that the ranking procedure identifies a number of general rules that may determine the accuracy of weather data. For example, the weather data dependent upon Nearby City weather is identified as less accurate than data dependent upon the actual city weather. Longer term forecasts, such as a nine-day forecast, are identified as less accurate than shorter term forecasts, such as one-day or five-day forecasts. Forecasts based upon Nearby City weather are identified as less accurate than forecasts based upon actual city weather. Hourly Data is identified as more accurate than Daily Data, and Daily Data is identified as more accurate than monthly averages. The ranking procedure may identify additional, fewer, or alternate generalities upon which the accuracy of the data may depend.

TABLE XI

Exemplary Ranking Procedure Results

| Rank | Description | Number of Readings | Hours | Full Rank Testing | Abbreviated Rank Testing |
|---|---|---|---|---|---|
| 1 | Point Data Measured on-site | 96 @15-min. readings | 24 | | |
| 2 | Daily Sum whose high is higher than Hourly high and/or whose Low is Lower than Hourly Low. | 8 | | Yes | Yes |
| 3 | Hourly | 16 | 16 | Yes | Yes |
| 4 | Nearby City: Daily Sum whose high is higher than Hourly high and/or whose Low is Lower than Hourly Low. | 8 | | | Yes |
| 5 | Nearby City: Hourly | 18 | 18 | Yes | Yes |
| 6 | 1-Day Forecast | — | — | Yes | |
| 7 | Hourly | 5 | 11 | Yes | Yes |
| 8 | 2-Day Forecast | — | — | Yes | |
| 9 | 3-Day Forecast | — | — | Yes | |
| 10 | Average of days on either side if their rank is 3 or better (i.e., lower) | — | — | Yes | Yes |
| 11 | 4-Day Forecast | — | — | Yes | |
| 12 | 1-Day Forecast from Nearby City | — | — | | |
| 13 | Nearby City: Hourly | 5 | 11 | Yes | Yes |
| 14 | 2-Day Forecast from Nearby City | — | — | Yes | |
| 15 | 3-Day Forecast from Nearby City | — | — | Yes | |
| 16 | 4-Day Forecast from Nearby City | — | — | | |
| 17 | Daily Sum | 7 | — | Yes | Yes |
| 18 | 5-Day Forecast | — | — | Yes | |
| 19 | Nearby City: Daily Sum | 7 | — | Yes | Yes |
| 20 | 6-Day Forecast | | | Yes | |
| 21 | 5-Day Forecast from Nearby City | — | — | Yes | |
| 22 | 7-Day Forecast | | | Yes | |
| 23 | Yahoo Monthly Avg. High and Low | — | — | Yes | Yes |
| 24 | 8-Day Forecast | | | Yes | |
| 25 | 9-Day Forecast | | | Yes | |
| 26 | 6-Day Forecast from Nearby City | | | Yes | |
| 27 | 7-Day Forecast from Nearby City | | | Yes | |
| 28 | Nearby City: Yahoo Monthly Avg. High and Low | — | — | Yes | Yes |
| 29 | 8-Day Forecast from Nearby City | | | Yes | |
| 30 | 9-Day Forecast from Nearby City | | | | |
| 31 | Average min & max from Daily Summary | | | Yes | |
| 32 | Average min & max from Daily Summary of Nearby City | | | | |

During one test of the system, weather data obtained from an independent source was compared to weather generated by the Weather Data Quality Control and Ranking Method. The comparisons between the Weather Data Quality Control and Ranking Method and the independent source data illustrate that a number of differences exist between the sources of weather data. The differences may result from truncation, nearby cities, or spikes in data.

Anomalies in weather data may result from either truncation or rounding. Temperature may be reported in whole degrees. For instance, when observations are taken from daily summary data, it is noted that the values are truncated. A temperature reading of 76.8 may become 76. Additionally, when data is taken from spot readings throughout the day, the temperatures may be given in degrees and tenths. The Weather Data Quality Control and Ranking Method subsequently rounds these numbers to the nearest whole value, such as, 76.8 being reported as 77 and 76.4 being reported as 76. However, rounding is more accurate than truncation. Over 20% of the differences between the two data sets were due to the rounding versus truncation distinction.

Anomalies also may result from the imperfect collection of weather data. In some situations, not enough data entries may be present to accurately determine the daily high and low temperatures. In such cases, a nearby city's weather data is examined. Both systems use the "nearby city" concept. Yet, different data providers may not always use the same nearby city. Also, different data providers may not always use nearby city weather data under the same conditions.

In the weather record, there may be obvious errors and anomalies. Spikes, which are a single aberrant value, are common. For example, an obvious spike value may be an entry of 167 degrees Fahrenheit. However, a less obvious spike may be to 92 degrees Fahrenheit when 78 degrees Fahrenheit is more likely. To identify this type of data problem, a slope test between data elements, such as the slope test previously discussed, may be used. Excessive slopes from one data point to another may signal a data spike.

FIGS. 11 through 14 illustrate exemplary problematic weather data sets for which the Weather Data Quality Control and Ranking Method provides replacement reasonable data. The method may provide reasonable data for additional, fewer, or alternate problematic data sets. The problematic data identified may be discarded. The method may replace the discarded data with one or more parameter information from the previous data entry, an average of the previous data entries, historical data, or an average of historical data. The method may determine approximate weather parameter that approximates actual weather parameters. The approximate weather parameter may be included as part the reasonable data that is accepted for use by the method. The method also may replace the discarded data with other alternate data or not replace the discarded or unacceptable data at all.

Figure 11:
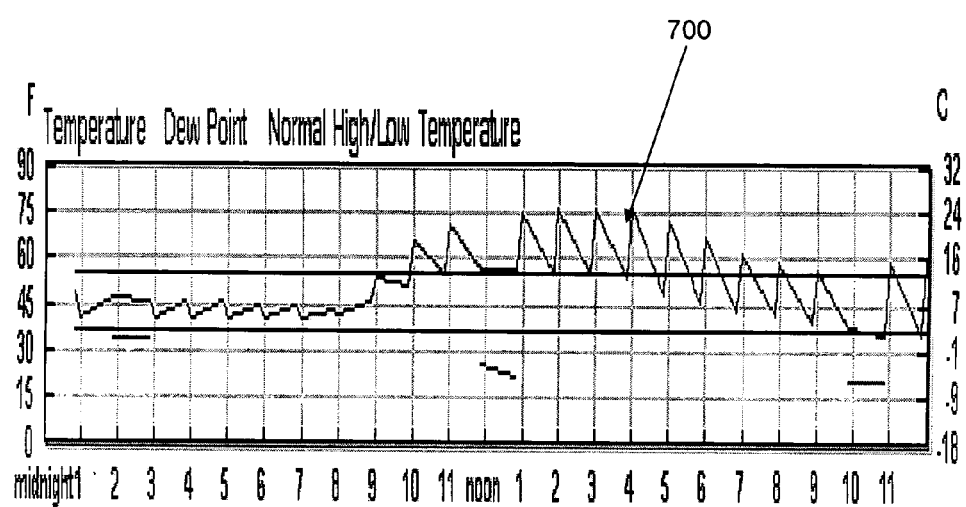
FIGS. 11 through 14 illustrate exemplary problematic weather data sets.

FIG. 11 illustrates an exemplary problematic weather data set. FIG. 11 is an example of data distortion that may result from two sets of temperature readings 700 in the same city. The two straight horizontal lines are the daily normal high and low temperature. Table XII is an exemplary problematic hourly weather data set corresponding to FIG. 11. It should be noted that Table XII corresponds to only an excerpt of the whole day. The data received includes complete or "full data" and "temperature-only data." The complete data shown in Table XIII includes weather information for dew point temperature, humidity, pressure, wind speed, and visibility. The complete data corresponds to the data sets with times 51 minutes past the hour, such as 12:51 a.m., 1:51 a.m., etc. On the other hand, the temperature-only data shown in Table XII includes only limited data, such as the dry bulb temperature. The temperature-only data corresponds to data sets with times 59 minutes past the hour, such as 12:59 a.m., 2:59 a.m., etc. As a result, the temperature graph shown in FIG. 11 is distorted and shaped like the teeth of a saw blade instead of a smooth curve.

Figure 12:
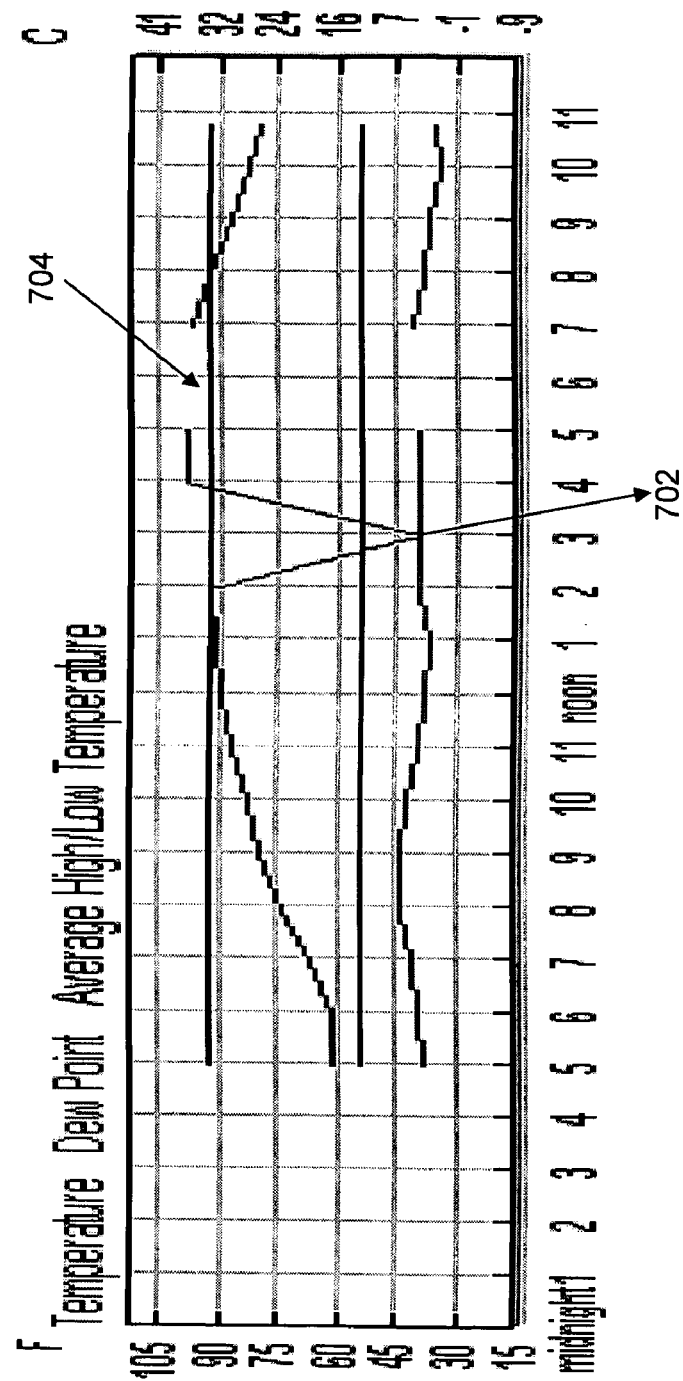

FIG. 12 illustrates another exemplary problematic weather data set. FIG. 12 is an example of a bad mid-day temperature reading 702 and gap 704 in the weather date. As shown, the temperature curve is rising as expected during the daylight hours only to experience an unexplained sharp dip and subsequent recovery. The temperature curve also shows a gap in the data.

Figure 13:
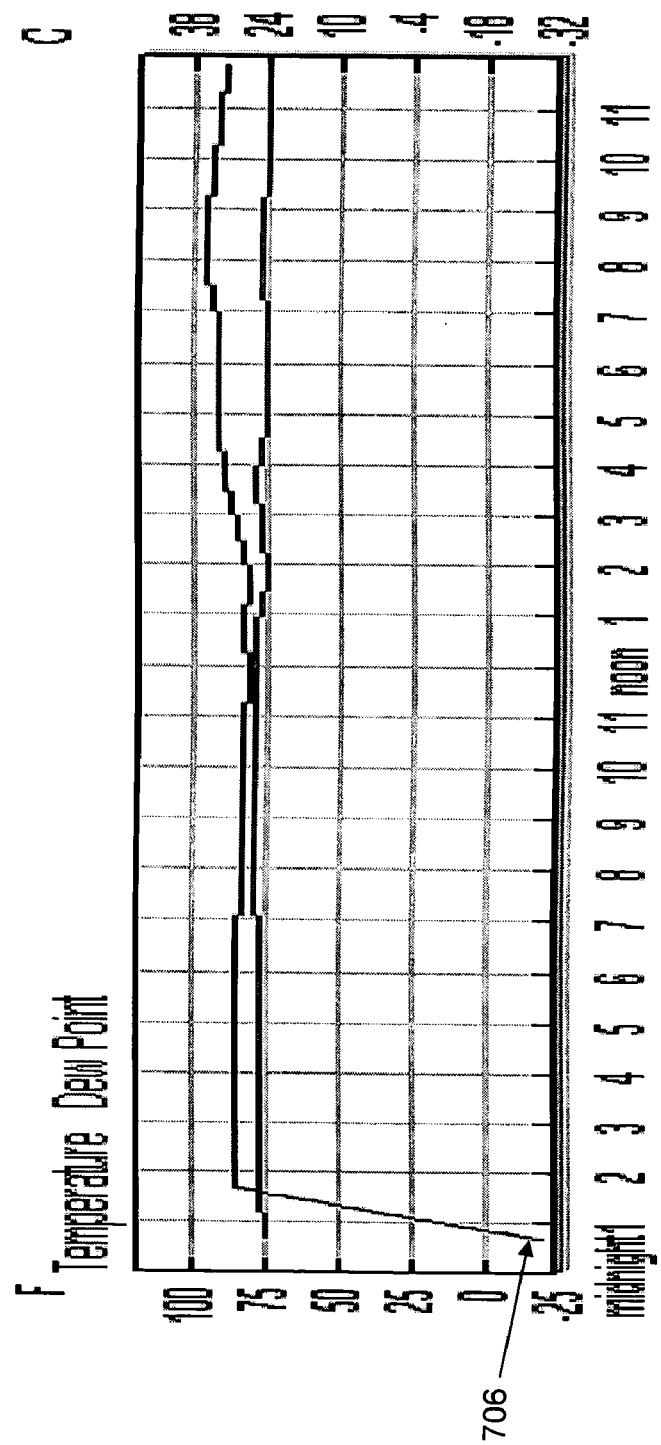

FIG. 13 illustrates another exemplary problematic weather data set. FIG. 13 is an example of a bad first temperature reading 706 of the day. FIG. 13 illustrates data received for Tampico, Mexico. As shown, the first temperature reading of the day is an unreasonable −22 degree Fahrenheit during July for the Mexican city.

Figure 14:
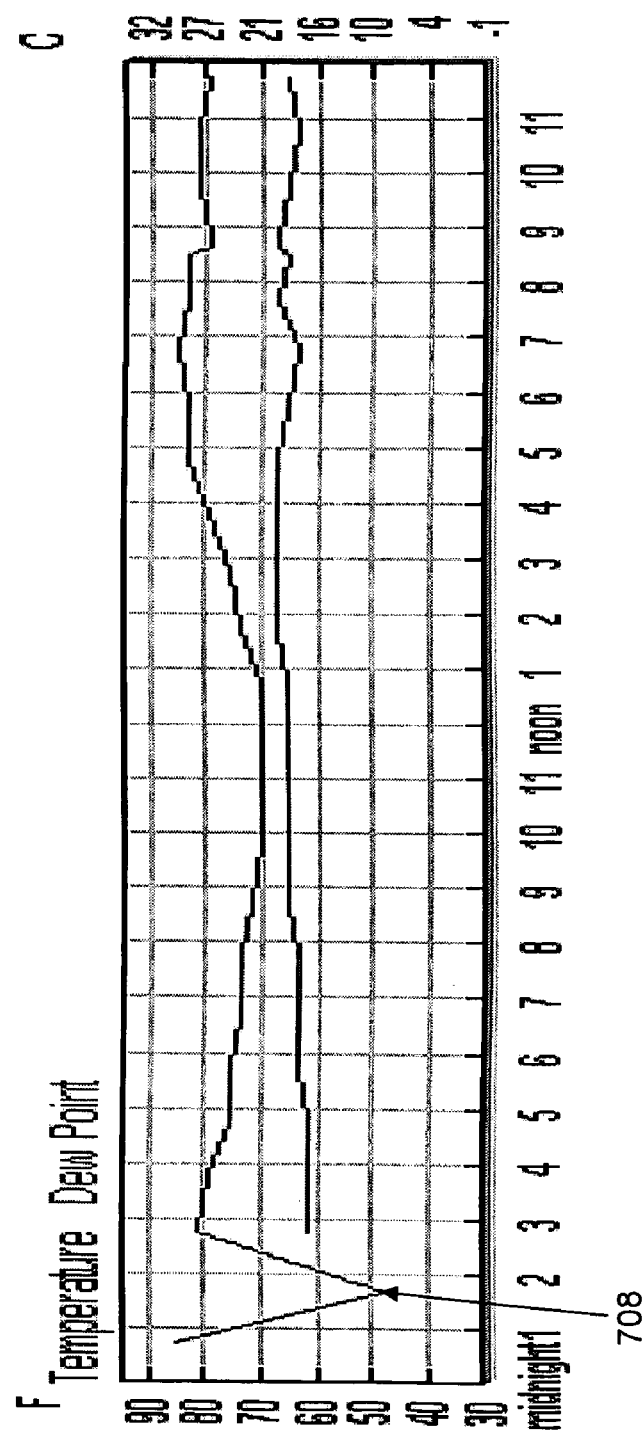

FIG. 14 illustrates another exemplary problematic weather data set. FIG. 14 shows another temperature dip 708. Table XIII below is an exemplary erroneous daily summary corresponding to FIG. 14. As shown, the bad daily low outside air temperature of only 46 degrees Fahrenheit, as compared with the actual daily low outside air temperature of approximately 70 degrees Fahrenheit, appeared in the daily summary.

TABLE XIII

| Erroneous Daily Summary Daily Summary | | | |
|---|---|---|---|
| | Actual | Average | Record |
| Temperature | | | |
| Mean Temperature | 65° F./18° C. | — | |
| Max Temperature | 84° F./29° C. | — | −0 |
| Min Temperature | 46° F./8° C. | — | −0 |
| Growing Degree Days | 15 (Base 50) | | |
| Moisture | | | |
| Dew Point | 62° F./16° C. | | |
| Average Humidity | 66 | | |

TABLE XII

| | | | | | | | | | | | |
|---|---|---|---|---|---|---|---|---|---|---|---|
| Exemplary Problematic Hourly Weather | | | | | | | | | | | |
| Time (EST) | Temperature | Dew Point | Humidity | Pressure | Visibility | Wind Direction | Wind Speed | Gust Speed | Precipitation | Events | Conditions |
| 12:51 AM | 46.9° F./ 8.3° C. | 33.1° F./ 0.6° C. | 59% | 29.80 in/ 1009.0 hPa | 10.0 miles/ 16.1 kilometers | SW | 8.1 mph/ 13.0 km/h | — | | N/A | Scattered Clouds |
| 12:59 AM | 39.2° F./ 4.0° C. | — | N/A % | —/— | — | North | — | — | | N/A | Unknown |
| 1:51 AM | 46.0° F./ 7.8° C. | 33.1° F./ 0.6° C. | 61% | 29.79 in/ 1008.8 hPa | 10.0 miles/ 16.1 kilometers | Variable | 4.6 mph/ 7.4 km/h | — | | N/A | Partly Cloudy |
| 2:51 AM | 45.0° F./ 7.2° C. | 33.1° F./ 0.6° C. | 63% | 29.78 in/ 1008.5 hPa | 10.0 miles/ 16.1 kilometers | Variable | 4.6 mph/ 7.4 km/h | — | | N/A | Partly Cloudy |
| 2:59 AM | 39.2° F./ 4.0° C. | — | N/A % | —/— | — | North | — | — | | N/A | Unknown |
| 3:51 AM | 45.0° F./ 7.2° C. | 34.0° F./ 1.1° C. | 65% | 29.78 in/ 1008.3 hPa | 10.0 miles/ 16.1 kilometers | Variable | 4.6 mph/ 7.4 km/h | — | | N/A | Clear |
| 3:59 AM | 39.2° F./ 4.0° C. | — | N/A % | —/— | — | North | — | — | | N/A | Unknown |
| 4:51 AM | 44.1° F./ 6.7° C. | 34.0° F./ 1.1° C. | 68% | 29.79 in/ 1008.6 hPa | 10.0 miles/ 16.1 kilometers | Variable | 4.6 mph/ 7.4 km/h | — | | N/A | Clear |
| 4:59 AM | 39.2° F./ 4.0° C. | — | N/A % | —/— | — | North | — | — | | N/A | Unknown |
| 5:51 AM | 43.0° F./ 6.1° C. | 35.1° F./ 1.7° C. | 74% | 29.78 in/ 1008.4 hPa | 10.0 miles/ 16.1 kilometers | Variable | 5.8 mph/ 9.3 km/h | — | | N/A | Clear |
| 5:59 AM | 39.2° F./ 4.0° C. | — | N/A % | —/— | — | North | — | — | | N/A | Unknown |
| 6:51 AM | 43.0° F./ 6.1° C. | 35.1° F./ 1.7° C. | 74% | 29.81 in/ 1009.3 hPa | 10.0 miles/ 16.1 kilometers | Variable | 4.6 mph/ 7.4 km/h | — | | N/A | Clear |
| 6:59 AM | 39.2° F./ 4.0° C. | — | N/A % | —/— | — | North | — | — | | N/A | Unknown |
| 7:51 | 42.1° F./ | 36.0° F./ | | 29.82 in/ | 10.0 miles/ | | 4.6 mph/ | | | | |

TABLE XIII-continued

| Erroneous Daily Summary Daily Summary | | | |
|---|---|---|---|
| | Actual | Average | Record |
| Maximum Humidity | 100 | | |
| Minimum Humidity | 48 | | |
| Precipitation | | | |
| Precipitation | 140.16 in/356.0 cm | — | −0 |

TABLE XIII-continued

Erroneous Daily Summary

| Daily Summary | | | |
|---|---|---|---|
| | Actual | Average | Record |
| Pressure | | | |
| Sea Level Pressure | 30.05 in/1016 hPa | | |
| Wind | | | |
| Wind Speed | 13 mph/20 km/h | 0 | |

Table XIV below is an exemplary erroneous hourly weather data set corresponding to FIG. 14. As shown, the bad daily low outside air temperature of only 46.4 degrees Fahrenheit, as compared with the actual daily low outside air temperature of approximately 70 degrees Fahrenheit, appeared in the hourly data as well. In addition to the dry bulb temperature being too low, the dew point temperature and humidity are too high and the pressure parameter blank.

perature readings is identified and the weather data corresponding to a nearby city is used. Alternate reasonable data also may be used to replace the problematic outside air temperature readings.

Additionally, erroneous weather data also may result when the daily summary high or maximum reading is higher than the highest spot reading. This situation may result if the daily summary high or maximum reading is manually inserted or adjusted. Likewise, the daily summary low or minimum reading may become lower than the lowest spot reading when manually adjusted. In one embodiment, the erroneous daily summary reading may be replaced with the highest or lowest spot reading. Alternate reasonable data also may be used to replace the problematic daily summary high or low data.

While the preferred embodiments of the invention have been described, it should be understood that the invention is not so limited and modifications may be made without departing from the invention. The scope of the invention is defined by the appended claims, and all devices that come

TABLE XIV

| | | | | | Erroneous Hourly Data | | | | | | |
|---|---|---|---|---|---|---|---|---|---|---|---|
| Time (GMT) | Temperature | Dew Point | Humidity | Pressure | Visibility | Wind Direction | Wind Speed | Gust Speed | Precipitation | Events | Conditions |
| 12:45 AM | 84.2° F./ 29.0° C. | 62.6° F./ 17.0° C. | 48% | 30.03 in/ 1016.8 hPa | 12.0 miles/ 19.3 kilometers | SE | 24.2 mph/ 38.9 km/h | — | N/A | | Scattered Clouds |
| | METAR MMMY 110045Z 14021KT 12SM SCT037 SCT200 29/17 A3003 RMK 8/402 DSTN CB/N | | | | | | | | | | |
| 1:40 AM | 46.4° F./ 8.0° C. | 755.6° F./ 402.0° C. | 100% | —/— | 15.0 miles/ 24.1 kilometers | SE | 15.0 mph/ 24.1 km/h | — | N/A | | Scattered Clouds |
| | METAR MMMY 110140Z 14013KT 15SM SCT050 SCT200 28/16 ARMK 8/402 DSTN CB/N | | | | | | | | | | |
| 2:45 AM | 80.6° F./ 27.0° C. | 60.8° F./ 16.0° C. | 51% | 29.86 in/ 1010.9 hPa | 15.0 miles/ 24.1 kilometers | SSE | 11.5 mph/ 18.5 km/h | — | N/A | | Clear |
| | METAR MMMY 110245Z 15010KT 15SM SKC 27/16 A3003 RMK SLP109 51007 909 | | | | | | | | | | |
| 3:48 AM | 78.8° F./ 26.0° C. | 60.8° F./ 16.0° C. | 54% | 30.04 in/ 1017.2 hPa | 15.0 miles/ 24.1 kilometers | ESE | 11.5 mph/ 18.5 km/h | — | N/A | | Clear |
| | METAR MMMY 110348Z 12010KT 15SM SKC 26/16 A3004 | | | | | | | | | | |
| 4:46 AM | 75.2° F./ 24.0° C. | 60.8° F./ 16.0° C. | 61% | 30.06 in/ 1017.8 hPa | 15.0 miles/ 24.1 kilometers | ESE | 11.5 mph/ 18.5 km/h | — | N/A | | Clear |
| | METAR MMMY 110446Z 12010KT 15SM SKC 24/16 A3006 | | | | | | | | | | |
| 5:43 AM | 75.2° F./ 24.0° C. | 62.6° F./ 17.0° C. | 65% | 30.00 in/ 1015.9 hPa | 15.0 miles/ 24.1 kilometers | East | 11.5 mph/ 18.5 km/h | — | N/A | | Scattered Clouds |
| | METAR MMMY 110543Z 10010KT 15SM SCT045 24/17 A3008 RMK SLP159 52048 8/500 922 | | | | | | | | | | |
| 6:40 AM | 73.4° F./ 23.0° C. | 62.6° F./ 17.0° C. | 69% | 30.07 in/ 1018.2 hPa | 15.0 miles/ 24.1 kilometers | East | 11.5 mph/ 18.5 km/h | — | N/A | | Clear |
| | METAR MMMY 110640Z 09010KT 15SM SKC 23/17 A3007 | | | | | | | | | | |
| 7:45 AM | 73.4° F./ 23.0° C. | 62.6° F./ 17.0° C. | 69% | 30.05 in/ 1017.5 hPa | 15.0 miles/ 24.1 kilometers | East | 11.5 mph/ 18.5 km/h | — | N/A | | Clear |

In the examples of FIGS. 11–14, the methods and systems for quality control of weather data are applied to identify all, some, or a subset of at least one of the errors or anomalies. The method and system also may identify erroneous weather data resulting from an inadequate number of temperature readings or manually entered data. For instance, erroneous weather data may result from too few outside air temperature readings being taken for a given day. As a result, the available data will likely not accurately represent the high, low, or average temperature for the day. Such errors will also effect the daily summary information. In one embodiment, the absence of an appropriate number of outside air temwithin the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A method of quality control for weather data, the method comprising:

receiving weather data from at least one weather data provider, the weather data including information pertaining to a plurality of weather parameters;

automatically identifying an inaccurate weather parameters from among the plurality of weather parameters using a process; and estimating and presents to a user an energy usage, an energy cost, or a cost savings associated with a building or a piece of equipment using the weather data exclusive of the inaccurate weather parameter.

2. The method of claim 1, comprising performing hourly data quality control checks on hourly weather parameter data.

3. The method of claim 2, wherein the hourly data quality control checks include identifying temperature only patterns in the hourly weather parameter data.

4. The method of claim 2, wherein the hourly data quality control checks include identifying erroneous hourly weather parameter data based upon time entry information.

5. The method of claim 2, wherein the hourly data quality control checks include comparison of a hourly dew point temperature with a corresponding hourly dry bulb temperature.

6. The method of claim 2, wherein the hourly data quality control checks include comparison of a hourly temperature with an average temperature.

7. The method of claim 2, wherein the hourly data quality control checks include comparison of a temperature change per unit time with a temperature slope limit.

8. The method of claim 2, wherein the hourly data quality control checks include comparison of a provisional daily high temperature and a provisional daily low temperature with historical temperature data.

9. The method of claim 1, comprising performing quality control checks on daily weather parameter data.

10. The method of claim 9, wherein the quality control checks include comparison of a daily high temperature with a daily low temperature.

11. The method of claim 9, wherein the quality control checks include comparison of a daily high temperature and a daily low temperature with a temperature determined to be inaccurate based upon a temperature change per unit time calculation.

12. The method of claim 9, wherein the quality control checks include comparison of a provisional high temperature with the boundaries of a high temperature range and comparison of a provisional low temperature with the boundaries of a low temperature range.

13. The method of claim 9, wherein the quality control checks include comparison of a dew point temperature with a dry bulb temperature.

14. The method of claim 1, comprising performing quality control checks on forecast weather parameter data.

15. The method of claim 14, wherein the quality control checks include comparison of a provisional high temperature with the boundaries of a high temperature range and comparison of a provisional low temperature with the boundaries of a low temperature range.

16. The method of claim 15, wherein the high and low temperature ranges correspond to an average high and low temperature range, a record high and low temperature range, a thirty-year average monthly high and low temperature range, or an all-time high and low temperature range, respectively.

17. The method of claim 1, comprising:

receiving weather data from a plurality of weather data providers;

ranking the accuracy of the weather data from each weather data provider; and calculating energy or cost savings for a building energy conservation measure based upon the most accurate weather data.

18. A method of quality control for weather data, the method comprising:

receiving a plurality of weather data sets, each weather data set including information pertaining to a plurality of weather values;

identifying inaccurate weather values;

ranking the weather data sets based upon the accuracy of the respective weather; and estimating and outputting to a user an energy usage, an energy cost, or a cost savings for associated with a building or a piece of equipment using a first weather data set ranked to be more accurate than a second weather data set.

19. The method of claim 18, comprising identifying inaccurate hourly weather parameter data.

20. The method of claim 19, comprising identifying "temperature only" patterns interspersed amongst "full data" patterns.

21. The method of claim 19, comprising comparing a hourly dew point temperature with a corresponding hourly dry bulb temperature.

22. The method of claim 19, comprising comparing a temperature change per unit time with a predetermined temperature slope.

23. The method of claim 18, comprising identifying inaccurate daily weather parameters.

24. The method of claim 23, comprising comparing a daily high temperature and a daily low temperature with a temperature determined to be inaccurate based upon a temperature change per unit time calculation.

25. The method of claim 23, comprising comparing a dew point temperature with a dry bulb temperature.

26. The method of claim 18, comprising identifying inaccurate forecast weather parameters.

27. The method of claim 26, comprising comparing a provisional high temperature with the boundaries of a high temperature range and a provisional low temperature with the boundaries of a low temperature range.

28. The method of claim 18, wherein the weather data from the most accurate weather data set is used to forecast energy and cost savings for a building energy conservation measure.

29. A system for identifying inaccurate weather parameters, the system comprising:

a processor operable to receive weather data and perform quality control checks on the weather data, the weather data including information pertaining to a plurality of weather parameters, wherein the quality control checks identify an erroneous weather parameters and the processor calculates and presents to a user an energy usage, an energy cost, or a cost savings associated with a building or a piece of equipment using the weather data exclusive of the erroneous weather parameter.

30. The system of claim 29, wherein the processor determines approximate weather parameter data that approximates actual weather parameters to replace the erroneous weather parameter data.

31. The system of claim 30, wherein the processor calculates energy and cost savings for a building energy conservation measure using the approximate weather parameter data.

32. The system of claim 31, wherein the processor receives weather data from a plurality of sources and ranks the sources based upon the accuracy of the weather data provided by each source.

33. The system of claim 29, wherein the quality control checks include hourly, daily, and forecast quality checks performed upon hourly, daily, and forecast weather parameters, respectively.

34. A computer-readable medium having instructions executable on a computer stored thereon, the instructions comprising:
    receiving a plurality of weather data sets, each weather data set including information pertaining to a plurality of weather values;
    ranking the weather data sets based upon the accuracy of the respective weather values; and
    calculating and outputting to a user an energy load, an energy cost, or a cost savings for a building using a weather data set ranked to be the most accurate.

35. The computer-readable medium of claim 34, comprising calculating the energy load and cost savings for a building energy conservation measure using the weather data set ranked to be the most accurate.

36. The computer-readable medium of claim 34, wherein the ranking of the weather data sets includes performing quality control checks on hourly weather values.

37. The computer-readable medium of claim 34, wherein the ranking of the weather data sets includes performing quality control checks on daily weather values.

38. The computer-readable medium of claim 34, wherein the ranking of the weather data sets includes performing quality control checks on forecast weather values.

39. The computer-readable medium of claim 34, comprising:
    storing the weather data sets in a memory; and
    automatically ranking the stored weather data sets if an up-to-date weather data set is not unavailable.

* * * * *